(12) United States Patent
Lee et al.

(10) Patent No.: US 11,281,370 B2
(45) Date of Patent: *Mar. 22, 2022

(54) ELECTRONIC DEVICE AND TOUCH GESTURE CONTROL METHOD THEREOF

(71) Applicant: Samsung Electronics Co., Ltd., Gyeonggi-do (KR)

(72) Inventors: Jae Wook Lee, Gyeonggi-do (KR); An Ki Cho, Gyeonggi-do (KR); Jun Hyung Cho, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 16/516,892

(22) Filed: Jul. 19, 2019

(65) Prior Publication Data

US 2019/0339856 A1 Nov. 7, 2019

Related U.S. Application Data

(63) Continuation of application No. 15/056,119, filed on Feb. 29, 2016, now Pat. No. 10,365,820.

(30) Foreign Application Priority Data

Feb. 28, 2015 (KR) .................. 10-2015-0028700

(51) Int. Cl.
*G06F 3/0488* (2013.01)
*G06F 3/04883* (2022.01)
(Continued)

(52) U.S. Cl.
CPC ........ *G06F 3/04883* (2013.01); *G06F 1/1694* (2013.01); *G06F 3/017* (2013.01); *G06F 3/0488* (2013.01); *G06F 21/31* (2013.01)

(58) Field of Classification Search
CPC .......... G06F 3/041–047; G06F 3/0488–04886; G06F 3/17; G06F 21/31
See application file for complete search history.

(56) References Cited

U.S. PATENT DOCUMENTS 6,094,506 A * 7/2000 Hullender ............ G06K 9/6256
382/185
8,327,295 B2 12/2012 Ikeda et al.
(Continued)

FOREIGN PATENT DOCUMENTS

CN 101620511 1/2010
CN 102356555 2/2012
(Continued)

OTHER PUBLICATIONS

International Search Report dated May 25, 2016 issued in counterpart application No. PCT/KR2016/001965, 12 pages.
(Continued)

*Primary Examiner* — Gene W Lee
(74) *Attorney, Agent, or Firm* — The Farrell Law Firm, P.C.

(57) ABSTRACT

Methods and apparatuses are provided for detecting a gesture at an electronic device. The gesture is received through an input module of the electronic device. A direction combination corresponding to the gesture is determined. The direction combination includes a plurality of directions. Information regarding the direction combination is compared with information regarding at least one direction combination, which is stored in a memory of the electronic device. A state of the electronic device is changed from a first state to a second state, using at least one processor of the electronic device, according to a result of comparing the information regarding the direction combination with the information regarding the at least one direction combination.

12 Claims, 17 Drawing Sheets

(51) Int. Cl.
*G06F 1/16* (2006.01)
*G06F 21/31* (2013.01)
*G06F 3/01* (2006.01)

(56) References Cited

U.S. PATENT DOCUMENTS

| | | |
|---|---|---|
| 8,504,842 B1 | 8/2013 | Meacham |
| 8,674,900 B2 | 3/2014 | Park |
| 8,692,764 B2 | 4/2014 | Marvit et al. |
| 8,913,028 B2 | 12/2014 | Chin |
| 9,032,337 B2 | 5/2015 | Oh et al. |
| 9,032,508 B2 | 5/2015 | Chu |
| 9,063,575 B2 | 6/2015 | Hule |
| 9,239,646 B2 | 1/2016 | Zo |
| 9,304,602 B2 * | 4/2016 | Ghassabian ......... G06F 3/04883 |
| 9,584,849 B2 * | 2/2017 | Choi ................. H04N 21/4828 |
| 9,671,952 B2 | 6/2017 | Takami |
| 9,891,822 B2 * | 2/2018 | Cho ....................... G06F 3/0236 |
| 10,503,376 B2 * | 12/2019 | Yang ..................... G06F 3/0488 |
| 2005/0100214 A1 * | 5/2005 | Zhang ..................... G06K 9/222 |
| | | 382/179 |
| 2005/0212760 A1 | 9/2005 | Marvit et al. |
| 2005/0219211 A1 | 10/2005 | Kotzin |
| 2008/0046425 A1 | 2/2008 | Perski |
| 2009/0179867 A1 * | 7/2009 | Shim .................. G06F 3/04883 |
| | | 345/173 |
| 2010/0005428 A1 | 1/2010 | Ikeda |
| 2010/0162182 A1 | 6/2010 | Oh et al. |
| 2010/0328201 A1 | 12/2010 | Marvit et al. |
| 2011/0055753 A1 | 3/2011 | Horodezky |
| 2011/0090155 A1 | 4/2011 | Caskey |
| 2011/0273379 A1 * | 11/2011 | Chen .................. G06F 3/04883 |
| | | 345/173 |
| 2011/0316797 A1 | 12/2011 | Johansson |
| 2012/0019465 A1 * | 1/2012 | Chen .................. G06F 3/04883 |
| | | 345/173 |
| 2012/0212450 A1 | 8/2012 | Takami |
| 2012/0327009 A1 | 12/2012 | Fleizach |
| 2013/0159939 A1 | 6/2013 | Krishnamurthi |
| 2013/0300687 A1 | 11/2013 | Park |
| 2014/0108934 A1 * | 4/2014 | Choi ....................... G06F 3/167 |
| | | 715/727 |
| 2014/0137234 A1 | 5/2014 | Chin |
| 2014/0176448 A1 | 6/2014 | Hule |
| 2014/0191954 A1 | 7/2014 | Marvit et al. |
| 2014/0210754 A1 | 7/2014 | Ryu et al. |
| 2014/0282047 A1 | 9/2014 | Lee et al. |
| 2014/0283009 A1 * | 9/2014 | Hsueh .................. G06F 3/0488 |
| | | 726/18 |
| 2014/0292668 A1 * | 10/2014 | Fricklas ................ G06F 3/0488 |
| | | 345/173 |
| 2014/0317499 A1 * | 10/2014 | Oh ........................ G06F 3/0304 |
| | | 715/702 |
| 2015/0133199 A1 | 5/2015 | Lee |
| 2015/0199125 A1 | 7/2015 | Tsukamoto |
| 2015/0227282 A1 | 8/2015 | Oh et al. |
| 2015/0324110 A1 | 11/2015 | Johansson |
| 2016/0042172 A1 | 2/2016 | Chiplunkar |

FOREIGN PATENT DOCUMENTS

| | | |
|---|---|---|
| CN | 103218067 | 7/2013 |
| CN | 103455272 | 12/2013 |
| CN | 103970441 | 8/2014 |
| KR | 1020130124854 | 11/2013 |
| KR | 1020140113188 | 9/2014 |
| WO | WO 2010/040670 | 4/2010 |

OTHER PUBLICATIONS

European Search Report dated Jul. 8, 2016 issued in counterpart application No. 16157714.3-1959, 7 pages.
Australian Examination Report dated Mar. 9, 2018 issued in counterpart application No. 2016224175, 5 pages.
Chinese Office Action dated Jun. 27, 2018 issued in counterpart application No. 201610113218.7, 15 pages.
Notice of Acceptance dated Jun. 27, 2018 issued in counterpart application No. 2016224175, 3 pages.
Chinese Office Action dated Apr. 12, 2019 issued in counterpart application No. 201610113218.7, 13 pages.
EP Summons to Attend Oral Proceedings dated Jul. 24, 2019 issued in counterpart application No. 16157714.3-1221, 7 pages.

* cited by examiner

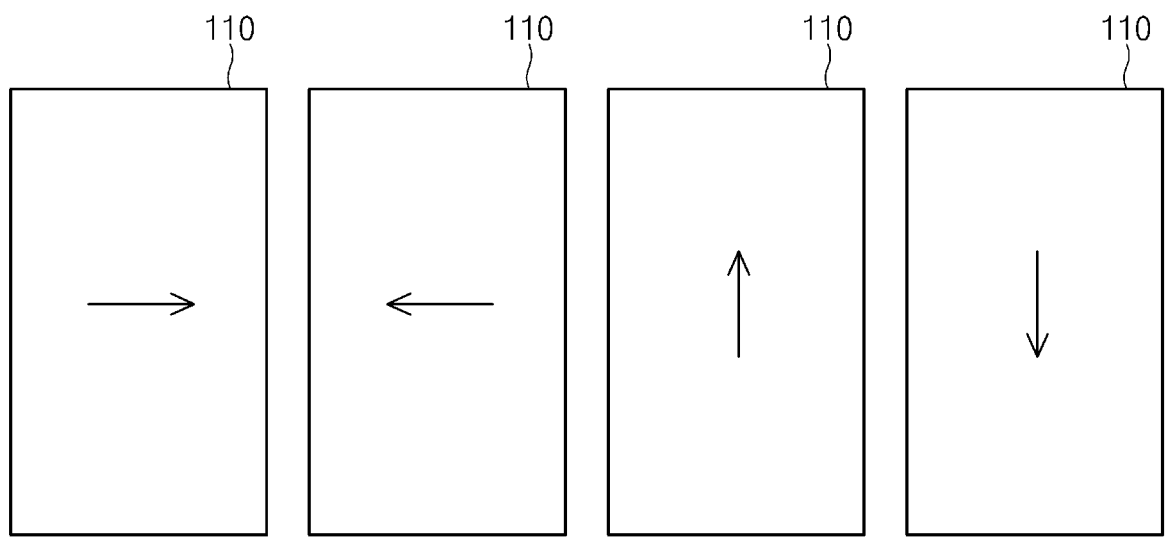

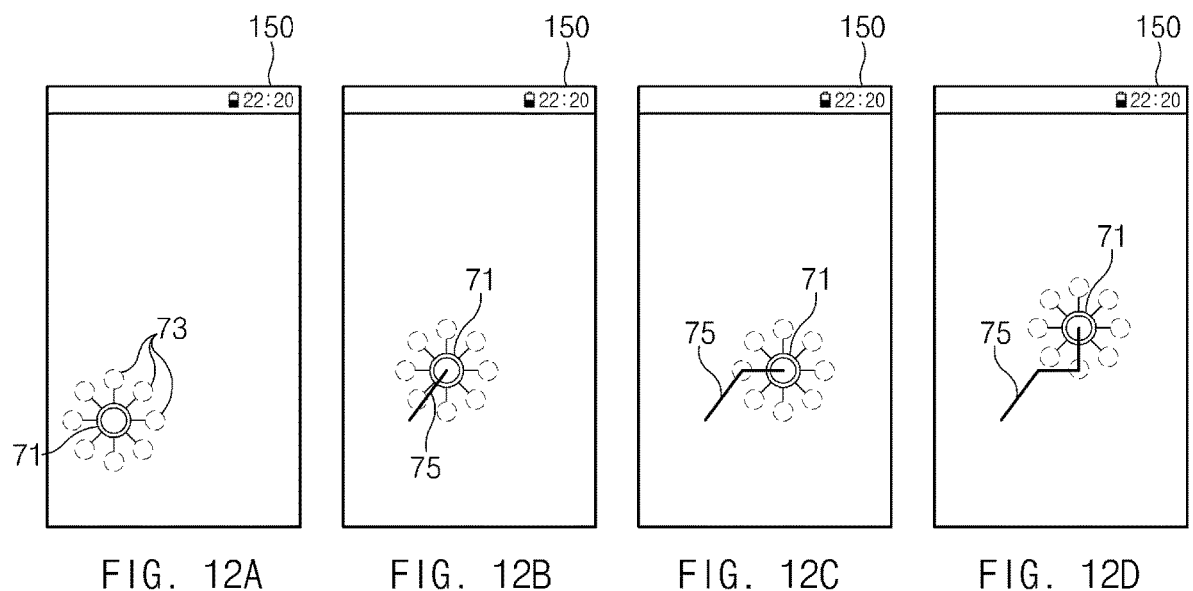

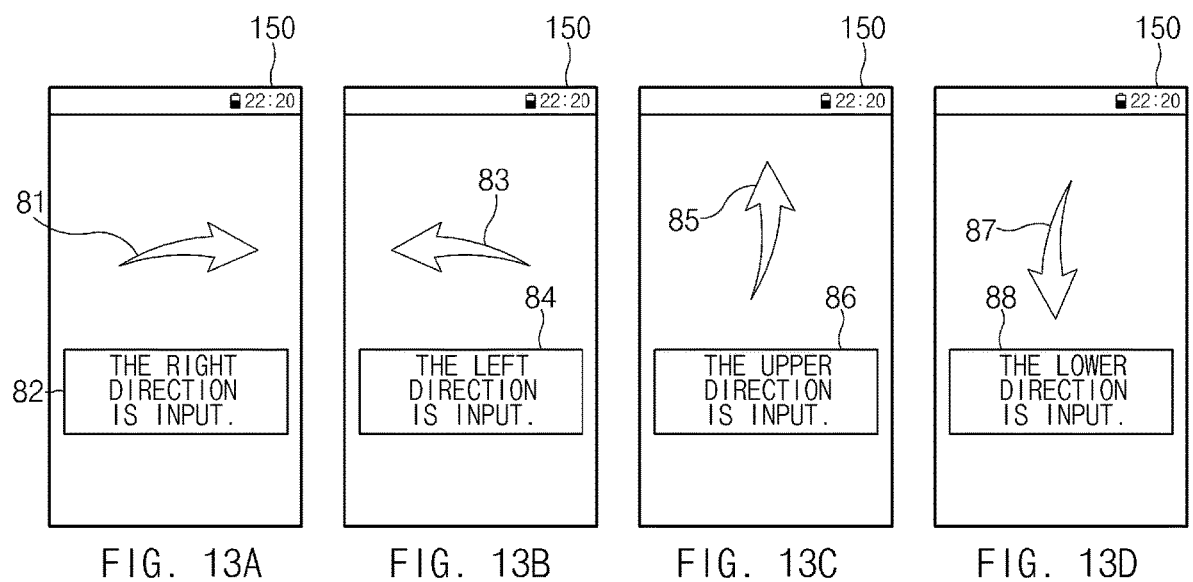

ELECTRONIC DEVICE AND TOUCH GESTURE CONTROL METHOD THEREOF

PRIORITY

This application is a Continuation and claims benefit of U.S. patent application Ser. No. 15/056,119, filed with the U.S. Patent and Trademark Office on Feb. 29, 2016, and claims priority under 35 U.S.C. § 119(a) to Korean Patent Application No. 10-2015-0028700, filed with the Korean Intellectual Property Office on Feb. 28, 2015, the entire disclosure of each of which are incorporated herein by reference.

BACKGROUND

1. Field of the Disclosure

The present disclosure relates generally to electronic device operations, and more particularly, to electronic devices and control methods of electronic devices for performing operations according to user inputs.

2. Description of the Related Art

With the development of electronic technologies, various types of electronic devices have been developed and propagated. Particularly, smart electronic devices, such as smartphones or tablet personal computers (PCs), have come into wide use. Smart electronic devices, such as smartphones, store a variety of personal information, such as, for example, contact information, photos, conversion contents, and emails. These smart electronic devices also provide a lock state in order to prevent the stored personal information from being accessed by others.

There may be a request to enter a password on a lock screen to unlock a smart electronic device. However, if a password comprising few number of letters is set, the password may be vulnerable to security. If a password comprising large number of letters is set, the user may feel inconvenience. Therefore, a pattern input method using a plurality of points is developed for users who feel uncomfortable to enter passwords. However, since it is possible to connect only fixed points in the pattern input method, it is impossible to enter a password with one hand of a user and there is a limit to security.

SUMMARY

The present disclosure has been made to address at least the above problems and/or disadvantages and to provide at least the advantages described below. Accordingly, an aspect of the present disclosure provides an electronic device for setting various patterns, for unlocking the electronic device according to preference of a user without refraining from an input form and an input region, and simply unlocking the electronic device with one hand of a user and performing an operation corresponding to a user input.

In accordance with an aspect of the present disclosure, an electronic device is provided that includes an input module configured to detect a gesture, a memory configured to store information regarding at least one direction combination and a control module configured to compare information regarding a direction combination corresponding to the gesture with the information regarding the at least one direction combination, which is stored in the memory, and change a state of the electronic device from a first state to a second state according to a result of comparing the information regarding the direction combination corresponding to the gesture with the information regarding the at least one direction combination, which is stored in the memory, with the direction combination corresponding to the gesture including a plurality of directions and the control module being further configured to determine a direction based on regions classified by at least two straight lines which intersect in a start point of a user input for inputting the direction.

In accordance with another aspect of the present disclosure, a control method of an electronic device is provided that includes receiving a gesture through an input module of the electronic device; determining a direction combination corresponding to the gesture, the direction combination including a plurality of directions; comparing information regarding the direction combination corresponding to the gesture with information regarding at least one direction combination, which is stored in a memory of the electronic device; and changing a state of the electronic device from a first state to a second state, using at least one processor of the electronic device, according to a result of comparing the information regarding the direction combination corresponding to the gesture with the information regarding the at least one direction combination, which is stored in the memory, with the at least one processor is configured to determine a direction based on regions classified by at least two straight lines which intersect in a start point of a user input for inputting the direction.

BRIEF DESCRIPTION OF THE DRAWINGS

The above and other aspects, features, and advantages of embodiments of the present disclosure will be more apparent from the following detailed description when taken in conjunction with the accompanying drawings, in which:

FIGS. 2A, 2B, 2C, and 2D are diagrams illustrating the determination of a direction of a user operation, according to an embodiment of the present disclosure;

FIGS. 12A, 12B, 12C, and 12D are diagrams illustrating the display of a guide corresponding to a user operation, according to an embodiment of the present disclosure;

FIGS. 13A, 13B, 13C, and 13D are diagrams illustrating the display of an object corresponding to a direction of a user operation, according to an embodiment of the present disclosure;

DETAILED DESCRIPTION

Figure 1:
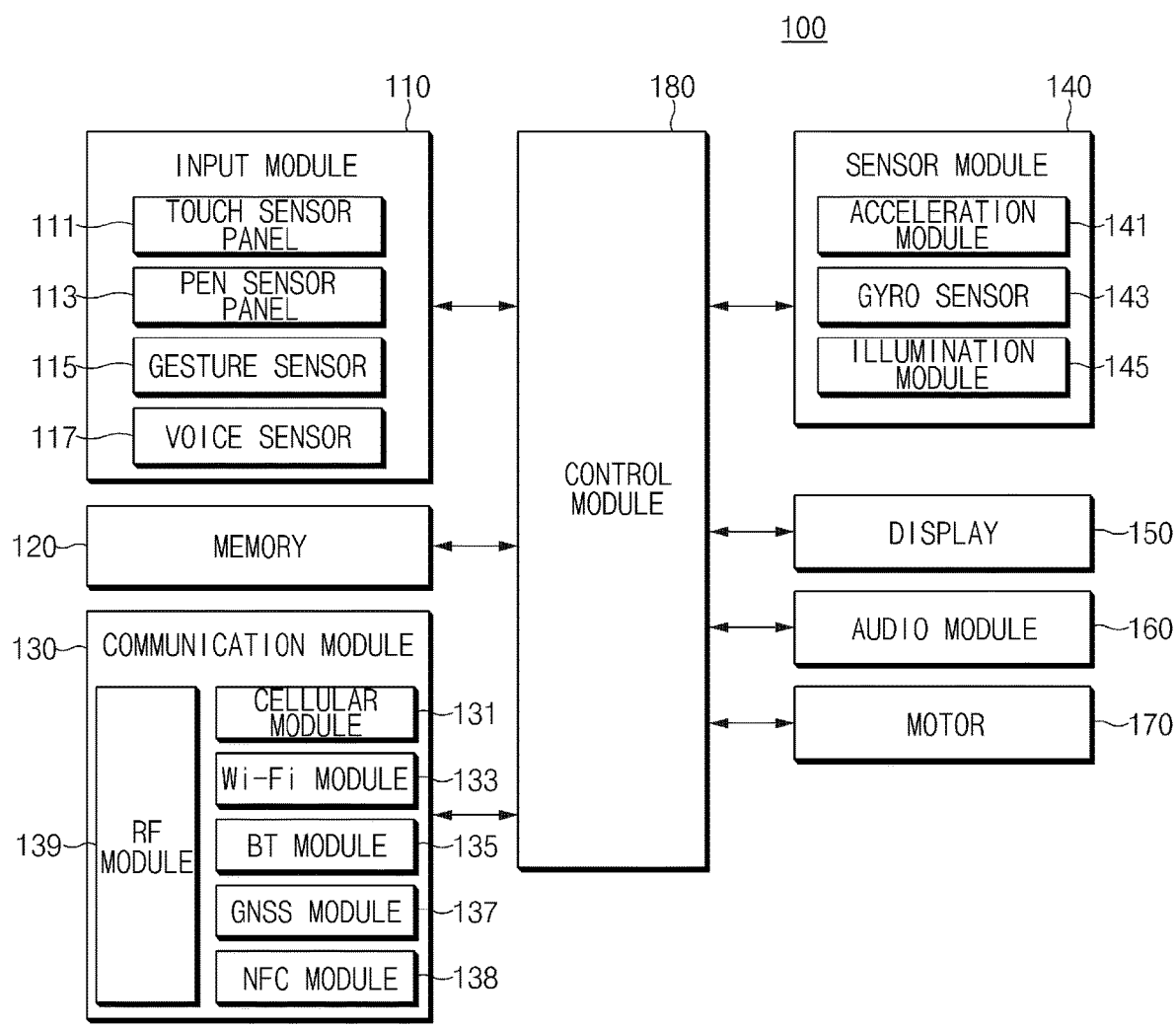
FIG. 1 is a block diagram illustrating a configuration of an electronic device, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

As described herein, the expressions "have", "may have", "include", "comprise", "may include", and "may comprise" indicate the existence of corresponding features (e.g., elements such as numeric values, functions, operations, or components) but do not exclude the presence of additional features.

As described herein, the expressions "A or B", "at least one of A and B", and "one or more of A and B" may include any and all combinations of one or more of the associated listed items. For example, the term "A or B", "at least one of A and B", and "one or more of A and B" may refer to a case where at least one A is included, a case where at least one B is included, or a case where both A and B are included.

Expressions such as "1st", "2nd", "first", and "second", as used herein, may refer to various elements irrespective of the order and/or priority of the corresponding elements, but do not limit the corresponding elements. The expressions may be used to distinguish one element from another element. For example, both "a first user device" and "a second user device" indicate different user devices irrespective of the order and/or priority of the corresponding elements. Additionally, a first component may be referred to as a second component and vice versa without departing from the scope of the present disclosure.

It will be understood that when an element (e.g., a first element) is referred to as being "(operatively or communicatively) coupled with/to" or "connected to" another element (e.g., a second element), it can be directly coupled with/to or connected to the other element, or an intervening element (e.g., a third element) may be present. In contrast, when an element (e.g., a first element) is referred to as being "directly coupled with/to" or "directly connected to" another element (e.g., a second element), it should be understood that there are no intervening elements (e.g., a third element).

The expression "configured to", as used herein, may be used interchangeably with, for example, "suitable for", "having the capacity to", "designed to", "adapted to", "made to", or "capable of". The term "configured to" does not only mean "specifically designed to" with respect to hardware. Instead, the expression "a device configured to" may mean that the device is "capable of" operating together with another device or other components. For example, a "processor configured to perform A, B, and C" may mean a generic-purpose processor (e.g., a central processing unit (CPU) or an application processor), which may perform corresponding operations by executing one or more software programs, that stores a dedicated processor (e.g., an embedded processor) for performing a corresponding operation.

Terms used herein are used to describe specific embodiments of the present disclosure and are not intended to limit the scope of the present disclosure. The terms of a singular form may include plural forms unless otherwise specified. Unless otherwise defined herein, all terms used herein, which include technical or scientific terms, may have the same meanings as those generally understood by a person skilled in the art. It will be further understood that terms, which are defined in a dictionary and are commonly used, should also be interpreted as is customary in the relevant related art and not in an idealized or overly formal manner unless expressly so defined herein. In some cases, even if terms are defined in the specification, they are not to be interpreted to exclude embodiments of the present disclosure.

Electronic devices, according to embodiments of the present disclosure, may be embodies as at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices (e.g., smart glasses, head-mounted-devices (HMDs), electronic apparel, electronic bracelets, electronic necklaces, electronic appcessories, electronic tattoos, smart mirrors, or smart watches).

According to embodiments of the present disclosure, the electronic devices may be embodied as smart home appliances. The smart home appliances may include at least one of, for example, televisions (TVs), digital versatile disc (DVD) players, audio players, refrigerators, air conditioners, cleaners, ovens, microwave ovens, washing machines, air cleaners, set-top boxes, home automation control panels, security control panels, TV boxes, game consoles, electronic dictionaries, electronic keys, camcorders, or electronic picture frames.

According to embodiments of the present disclosure, the electronic devices may be embodied as at least one of various medical devices (e.g., various portable medical measurement devices (e.g., blood glucose meters, heart rate meters, blood pressure meters, or thermometers, and the like), magnetic resonance angiography (MRA), magnetic resonance imaging (MRI), computed tomography (CT), scanners, or ultrasonic devices, and the like), navigation devices, global navigation satellite system (GNSS), event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automated teller machines (ATMs), points of sales (POSs) devices, or Internet of Things (IoT) (e.g., light bulbs, various sensors, electric or gas meters, sprinkler devices, fire alarms, thermostats, street lamps, toasters, exercise equipment, hot water tanks, heaters, boilers, and the like).

According to embodiments of the present disclosure, the electronic devices may be embodied as at least one of parts of furniture or buildings/structures, electronic boards, electronic signature receiving devices, projectors, or various measuring instruments (e.g., water meters, electricity meters, gas meters, or wave meters, and the like). The electronic devices, according to various embodiments of the present disclosure, may be one or more combinations of the above-described devices. The electronic devices, according to various embodiments of the present disclosure, may be flexible electronic devices. Also, electronic devices, according to various embodiments of the present disclosure, are not limited to the above-described devices, and may include new electronic devices according to the development of new technologies.

Hereinafter, electronic devices, according to embodiments of the present disclosure, are described with reference to the accompanying drawings. The term "user", as used herein, may refer to a person who uses an electronic device, or may refer to a device (e.g., an artificial intelligence electronic device) that uses an electronic device.

FIG. 1 is a block diagram illustrating a configuration of an electronic device, according to an embodiment of the present disclosure.

Referring to FIG. 1, an electronic device 100 includes an input module 110, a memory 120, a communication module 130, a sensor module 140, a display 150, an audio module 160, a motor 170, and a control module 180.

According to an embodiment of the present disclosure, the input module 110 may detect a user operation (or a gesture). According to an embodiment of the present disclosure, the input module 110 includes at least one of a touch sensor panel 111, a pen sensor panel 113, a gesture sensor 115, and a voice sensor 117.

The touch sensor panel 111 senses a touch operation of a user. The pen sensor panel 113 senses a pen operation of the user. The gesture sensor 115 (or a motion sensor) recognizes a motion of the user. The voice sensor 117 recognizes a voice of the user.

The touch sensor panel 111 may use at least one of an electrostatic type, a resistive type, an infrared type, or an ultrasonic type. Also, the touch sensor panel 111 may further include a control circuit. The touch sensor panel 111 may further include a tactile layer and may provide a tactile reaction to the user. The pen sensor panel 113 may be, for example, part of a touch panel or may include a separate sheet for recognition.

According to an embodiment of the present disclosure, the gesture sensor 115 (or the motion sensor) may include a camera. The gesture sensor 115 may capture motion of the user (e.g., motion of his or her arm or finger) and may recognize his or her gesture. According to an embodiment of the present disclosure, the camera included in the gesture sensor 115 may include an infrared sensor for recognizing a gesture of the user.

According to an embodiment of the present disclosure, the voice sensor 117 may include a microphone and may recognize a voice of the user input through the microphone. The user operation used herein may include a voice operation recognized by a voice of the user.

According to an embodiment of the present disclosure, a user operation input through the input module 110 may be input in a subsequent or non-subsequent manner. With respect to the subsequent manner of input, for example, one user operation may include a plurality of directions, and the user may input one user operation in order to input a plurality of directions (e.g., four directions). With respect to the non-subsequent manner of input, for example, one user operation may include one direction, and the user may input a plurality of user operations in the non-subsequent manner to input a plurality of directions.

According to an embodiment of the present disclosure, the input module 110 may detect a user operation that is input within a specific distance through the pen sensor panel 113, the gesture sensor 115, and the like, without being in direct contact with the touch sensor panel 111. The input module 110 may also detect a user operation that is in direct contact with the touch sensor panel 111. According to an embodiment of the present disclosure, an object (e.g., a pen or a finger of the user), that is approaching to input a user operation, may be recognized using a proximity sensor.

According to an embodiment of the present disclosure, the input module 110 may be implemented as being independent from the electronic device 100, as well as being embedded in the electronic device 100, and may include an external input device connected with the electronic device 100 by wire or wirelessly.

According to an embodiment of the present disclosure, the input module 110 (e.g., the touch sensor module 111 or the pen sensor module 113) may include a plurality of regions (e.g., two or more regions). The input module 110 may detect a user operation input to at least some of the plurality of regions. For example, the user may input a user operation to one of the plurality of regions or may input a user operation to all of the plurality of regions.

According to an embodiment of the present disclosure, the input module (e.g., the touch sensor panel 111) may activate only some regions that are predicted to receive an input as a user operation, from among the plurality of regions. For example, if the user operates the electronic device 100 with his or her left hand, the input module 110 may activate some regions corresponding to the left hand among the plurality of regions, and may receive an input from the user in the activated. According to an embodiment of the present disclosure, the input module 110 may detect a user operation irrespective of an on/off state of the display 150. For example, the input module 110 (e.g., the touch sensor panel 111) may receive power in a state where the display 150 is powered-off (or in a waiting state) and may detect a user operation.

According to an embodiment of the present disclosure, the memory 120 may store information about at least one direction combination. According to an embodiment of the present disclosure, the direction combination may include at least one of a direction of a user operation, an input order of the user operation, a detecting region of the user operation, or a type of a device to which the user operation is input. According to an embodiment of the present disclosure, the memory 120 may map an operation (or a command) that may be performed by the control module 180 to each of at least one direction combination and may store the mapped information. For example, a first direction combination may be mapped to an operation of unlocking the electronic device 100 and the mapped information may be stored in the memory 120. A second direction pattern may be mapped to an operation of executing a camera application and the mapped information may be stored in the memory 120.

According to an embodiment of the present disclosure, information about a direction combination and an operation, which is stored in the memory 120, may be set by the user. For example, the electronic device 100 may receive information about a direction combination and a corresponding operation for unlocking the electronic device 100 from the user. Information about a direction combination input by the user may be stored in the memory 120. According to an embodiment of the present disclosure, information about a direction combination and a corresponding operation, which is stored in the memory 120, may be changed by the user.

According to an embodiment of the present disclosure, the communication module 130 may connect with an external device to communicate with the external device. The communication module 130 may connect with the external device by wire or wirelessly. According to an embodiment of the present disclosure, the communication module 130 may connect with the external device using a wireless communication, technology such as, for example, Bluetooth (BT), near field communication (NFC), Zigbee, wireless-fidelity (Wi-Fi), 3rd generation (3G), long term evolution (LTE), or global navigation satellite system (GNSS).

According to an embodiment of the present disclosure, the communication module 130 includes at least one of a cellular module 131, a Wi-Fi module 133, a BT module 135, a GNSS module 137 (e.g., a global positioning system (GPS) module, a Glonass module, a Beidou module, or a Galileo module), an NFC module 138, and a radio frequency (RF) module 139.

The cellular module 131 may provide, for example, a voice call service, a video call service, a text message service, or an Internet service, through a cellular network. According to an embodiment of the present disclosure, the cellular module 131 may identify and authenticate the electronic device 100 in a communication network using a subscriber identification module (SIM) (e.g., a SIM card).

The Wi-Fi module 133, the BT module 135, the GNSS module 137, and the NFC module 138 may include, for example, a processor for processing data transmitted and received through the corresponding module. According to embodiments of the present disclosure, at least some (e.g., two or more) of the cellular module 131, the Wi-Fi module 133, the BT module 135, the GNSS module 137, and the NFC module 138 may be included in one integrated chip (IC) or one IC package.

The RF module 139 may transmit and receive a communication signal (e.g., an RF signal). The RF module 139 may include a transceiver, a power amplifier module (PAM), a frequency filter, a low noise amplifier (LNA), or an antenna. According to another embodiment of the present disclosure, at least one of the cellular module 131, the Wi-Fi module 133, the BT module 135, the GNSS module 137, and the NFC module 138 may transmit and receive an RF signal through a separate RF module.

According to an embodiment of the present disclosure, the communication module 130 may receive a user operation, which is detected through an external input device, from the external input device. For example, if the external input device is a touch sensor panel or a pen sensor panel, the communication module 130 may receive a coordinate value input by a touch operation or a pen operation of the user.

According to an embodiment of the present disclosure, the cellular module 131 may obtain serving cell identification information through the cellular network. The Wi-Fi module 133 may obtain access point (AP) identification information through a Wi-FI network. The GNSS module 137 may obtain current location information of the electronic device 100. The BT module 135 or the NFC module 138 may connect with a vehicle and may receive a variety of information associated with the vehicle from the vehicle.

According to an embodiment of the present disclosure, the sensor module 140 may sense a state (or a situation) around the electronic device 100. The sensor module 140 includes at least one of an acceleration sensor 141, a gyro sensor 143, and an illumination sensor 145. The acceleration sensor 141 may determine acceleration of the electronic device 100. The acceleration sensor 141 may measure a direction of gravity (or a tilt of the electronic device 100). The acceleration sensor 141 may sense gravity acceleration and may measure the direction of gravity. Also, the acceleration sensor 141 may sense the tilt of the electronic device 100 using the gravity acceleration. The gyro sensor 143 may determine rotation of the electronic device 100. The illumination sensor 145 may sense illumination (or brightness) around the electronic device 100. If an object (e.g., a user's hand and the like) is approaching the electronic device 100, a proximity sensor may sense a position of the object close to the electronic device 100.

According to an embodiment of the present disclosure, the display 150 may display a user interface including a variety of text, icons, or images. The user interface displayed on the display 150 may be criteria for determining a direction of a user operation. The display 150 may display a guide for helping to perform a user operation.

According to an embodiment of the present disclosure, the display 150 may display an object that displays a direction of a user operation. The display 150 may include a panel, a hologram device, or a project. The panel may be implemented to be, for example, flexible, transparent, or wearable. The panel and the touch sensor panel 111 may be integrated into one module, for example, a touch screen. The hologram device may show a stereoscopic image in a space using interference of light. The projector may project light onto a screen to display an image. The screen may be positioned, for example, inside or outside the electronic device 100.

According to an embodiment of the present disclosure, the display 150 may display a different object according to a direction of a user operation. For example, the display 150 may display an arrow, text, or a video effect (e.g., an effect of turning over a page in a direction of a user operation) indicating a direction of a user operation, The audio module 160 may convert an electric audio signal into a sound and may output the converted sound. For example, the audio module 160 may include an audio interface that may connect with a speaker or an earphone (or a headphone), or an embedded speaker.

According to an embodiment of the present disclosure, the audio module 160 may output an audio signal corresponding to a direction of a user operation. The audio module 160 may output a different audio signal according to a direction of a user operation. For example, the audio module 160 may output different music, a different animal's sound, or a different warning sound, which correspond to each of upper, lower, left, and right directions, or a stereo voice having directionality, and the like, as well as voice signals indicating the upper, lower, left, and right directions.

According to an embodiment of the present disclosure, the audio module 160 may output a different audio signal according to a device that outputs an audio signal. For example, since security is guaranteed if an earphone connects to an audio interface, the audio module 160 may output an audio signal such that the user may directly know a direction, such as the upper, lower, left, or right direction, through the earphone. In another example, if an external speaker connects to the audio interface or if an audio signal is output through an embedded speaker, the audio module 160 may output an audio signal, such as an animal's sound or a warning sound corresponding to each of the upper, lower, left, and right directions, such that the user may infer a direction.

The motor 170 may convert an electric signal into mechanical vibration and may generate a vibration or a haptic effect, and the like. According to an embodiment of the present disclosure, the motor 170 may generate a different vibration according to a direction of a user operation. The motor 170 may generate a vibration a different number of times, at a different time, or having a different pattern according to a direction of a user operation. For example, if a user operation of an upper direction is input, the motor 170 may generate short vibration. If a user operation of a lower direction is input, the motor 170 may generate short vibration twice. If a user operation of a left direction is input, the motor 170 may generate short vibration once and may then generate long vibration once. If a user operation of a right direction is input, the motor 170 may generate long vibration once and may then generate short vibration once.

According to an embodiment of the present disclosure, the motor 170 may generate a vibration having directionality corresponding to a direction of a user operation. For example, if a user operation of a right direction is input, the motor 170 may generate vibration from a left side (or the center) of the electronic device 100 to a right side of the electronic device 100. If a user operation of an upper direction is input, the motor 170 may generate vibration from a lower side (or the center) of the electronic device 100 to an upper side of the electronic device 100.

According to an embodiment of the present disclosure, the motor 170 may include a plurality of motors. For example, the motor 170 may include motors in positions corresponding to each of the upper, lower, left, and right directions. If a user operation is input, one of the motors corresponding to a direction of the user operation may vibrate.

The control module 180 may control an overall operation of the electronic device 100. For example, the control module 180 may control each of the input module 110, the memory 120, the communication module 130, the sensor module 140, the display 150, the audio module 160, and the motor 170 to unlock the electronic device 100, according to embodiments of the present disclosure.

According to an embodiment of the present disclosure, the control module 180 may determine a direction combination of a user operation detected by the input module 110. The control module 180 may determine a direction of a user operation detected by the input module 110. For example, the control module 180 may analyze a user operation and may determine a direction of the user operation as one of four directions (e.g., a right direction, a left direction, an upper direction, and a lower direction). In another example, the control module 180 may analyze a user operation and may determine a direction of the user operation as one of eight directions (e.g., a right direction, a left direction, an upper direction, a lower direction, a right upper side, a right lower side, a left upper side, and a left lower side). The direction of the user operation may be interpreted as the same as an angle of the user operation. For example, if a start point of the user operation is regarded as an origin of a two-dimensional (2D) coordinate system, a direction of the user operation may be indicated as an angle. For example, a right direction, an upper direction, a left direction, and a lower direction may correspond to 0 degree, 90 degrees, 180 degrees, and 270 degrees, respectively. A right upper direction, a left upper direction, a left lower direction, and a right lower direction may correspond to 45 degrees, 135 degrees, 225 degrees, and 315 degrees, respectively.

According to an embodiment of the present disclosure, the control module 180 may selectively activate a region for receiving a user operation according to whether the display 150 is turned on/off, a user interface displayed on the display 150, a status where the user grips the electronic device 100, or user settings. For one example, the control module 180 may detect a status where the user grips the electronic device 100 and may determine whether he or she operates the input module 110 with his or her left hand or his or her right hand. The control module 180 may process only a user operation detected within a specific region (e.g., a left upper end or a right lower end of the sensor module 140) of the input module 110 (e.g., the touch sensor panel 111 or the pen sensor panel 113) corresponding to a grip status of the user and may ignore user operations detected on the other regions. In another example, the control module 180 may control the sensor module 140 to sense only a specific region and not to sense the other regions.

According to an embodiment of the present disclosure, the control module 180 may determine a direction of a user operation after a specific user operation (e.g., a double tap) is input to the input module 110 (e.g., the touch sensor panel 111) in a state where the display 150 is powered-off. Specifically, the user may input a trigger operation for unlocking the electronic device 100 and may then input a user operation having directionality.

According to an embodiment of the present disclosure, if a user operation is input in a non-subsequent manner, the control module 180 may determine a direction from a start point of the user operation to an end point of the user operation as a direction of the user operation. For example, if the start point of the user operation is the same as the end point of the user operation and if a plurality of user operations having different paths are input, the control module 180 may equally determine directions of the plurality of user operations.

According to an embodiment of the present disclosure, if a plurality of user operations are input in a non-subsequent way, the control module 180 may set a time (e.g., three seconds) when each of the plurality of user operations is input and may include only a user operation detected within the set time in a direction combination. For example, if a second gesture is detected within a set time after a first gesture is detected, the control module 180 may include a direction corresponding to the second gesture in the direction combination. If the second gesture is detected more than a specified time after the first gesture is detected, the control module 180 may exclude the direction corresponding to the second gesture from the direction combination. According to an embodiment of the present disclosure, after one user operation is input, if a subsequent user operation is not input within a set time, the control module 180 may determine that a user operation for receiving a direction combination is ended.

According to an embodiment of the present disclosure, the control module 180 may measure an amount of a time for inputting a subsequent user operation at a time when one user operation is input. If a first user operation is detected, the control module 180 may measure an amount time for inputting a second user operation. If the second user operation is detected within a set time, the control module 180 may measure an amount of time for inputting a third user operation.

According to an embodiment of the present disclosure, if a user operation is detected having a specified length or more in a specific direction, the control module 180 may determine that the user operation is input in the specific direction. If the user operation is detected having the specified length or more, although the user operation is continuously detected in the same direction, the control module 180 may determine that one user operation is input in a specific direction. If a user operation is detected having a specified time or more in a specific direction, the control module 180 may determine that the user operation is input in the specific direction. After a user operation is input at having a specified length or more or having a specified time or more in a first direction, if a user operation is subsequently input at the specified length or more or in the specified time or more in a second direction, the control module 180 may determine that a plurality of user operations may sequentially input in the first and second directions.

According to an embodiment of the present disclosure, if a user operation (or a gesture) is recognized through a motion sensor, the control module 180 may determine a direction of the user operation according to motion of the user over time. For one example, if the user moves his or her arm from a left side to a right side, the control module 180 may determine that a user operation is input in a right direction. In another example, if the user moves his or her finger on his or her desk and draws a direction, the control module 180 may determine that a user operation is input in a specific direction according to movement of his or her finger.

Methods of determining the direction of a user operation are described with reference to FIGS. 2A to 8, according to embodiments of the present disclosure.

FIGS. 2A to 2D are diagrams illustrating an operation of determining a direction of a user operation, according to an embodiment of the present disclosure. Particularly, in FIGS. 2A to 2D, a user inputs one of four directions using a single user operation.

FIGS. 2A to 2D illustrate various examples of a user operation detected by the input module 110 (e.g., the touch sensor panel 111) of FIG. 1. According to an embodiment of the present disclosure, a control module 180 of FIG. 1 may determine a direction of a user operation according to a position where the user operation moves (e.g., positions of a start point and an end point of the user operation). As shown in FIG. 2A, if a user operation is ended after being detected with a specified length or more, or for a specified time or more, in a right direction from a start point of the user operation, the control module 180 determines a direction of the user operation as the right direction. As shown in FIG. 2B, if a user operation is ended after being detected with the specified length or more, or for the specified time or more, in a left direction from the start point, the control module 180 determines a direction of the user operation as the left direction. As shown in FIG. 2C, if a user operation is ended after being detected with the specified length or more, or for the specified time or more in an upper direction from the start point, the control module 180 determines a direction of the user operation as the upper direction. As shown in FIG. 2D, if a user operation is ended after being detected with the specified length or more, or for the specified time or more, in a lower direction from the start point, the control module 180 determines a direction of the user operation as the lower direction.

FIGS. 3A to 3H are diagrams illustrating the determination of a direction of a user operation, according to an embodiment of the present disclosure. Particularly, in FIGS. 3A to 3H, a user inputs one of eight directions using a single user operation.

Figure 3A:
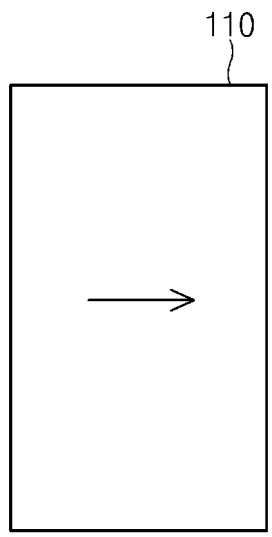
FIGS. 3A, 3B, 3C, 3D, 3E, 3F, 3G, and 3H are diagrams illustrating the determination of a direction of a user operation, according to an embodiment of the present disclosure.
Figure 3B:
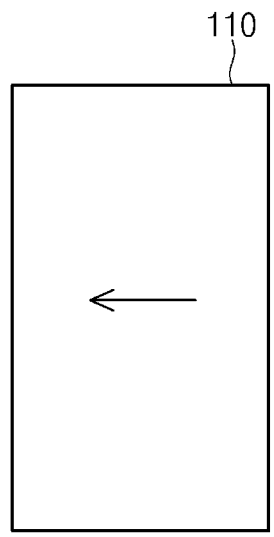
Figure 3C:
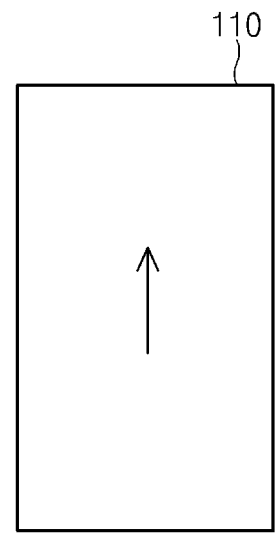
Figure 3D:
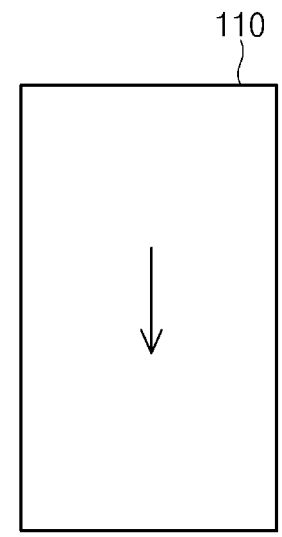
Figure 3E:
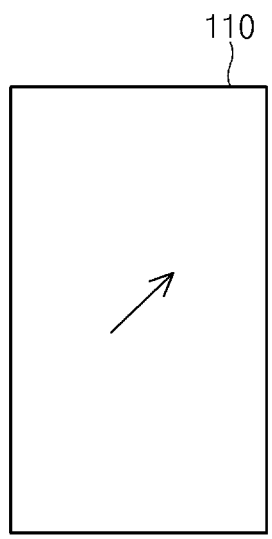
Figure 3F:
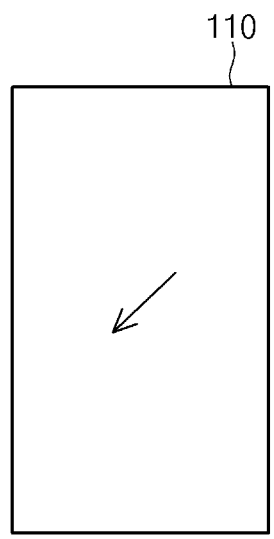
Figure 3G:
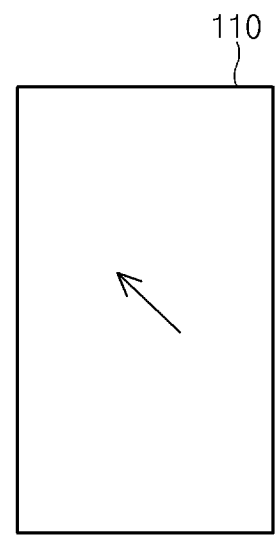
Figure 3H:
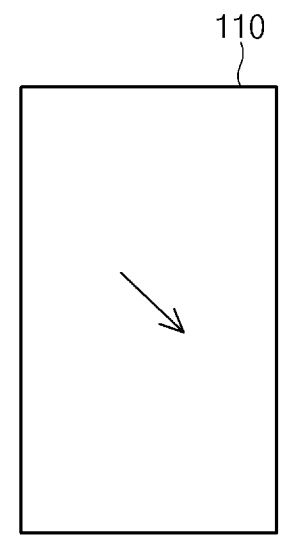

FIGS. 3A to 3H illustrate various examples of a user operation detected by the input module 110 (e.g., the touch sensor panel 111) of FIG. 1. According to an embodiment of the present disclosure, the control module 180 of FIG. 1 determines a direction of a user operation according to a position of a start point and a position of an end point of the user operation. As shown in FIG. 3A, if the user operation is ended after being detected with a specified length or more, or for a specified time or more, in a right direction from a start point of the user operation, the control module 180 determines a direction of the user operation as the right direction. As shown in FIG. 3B, if the user operation is ended after being detected with the specified length or more, or for the specified time or more, in a left direction from the start point, the control module 180 determines a direction of the user operation as the left direction. As shown in FIG. 3C, if the user operation is ended after being detected with the specified length or more, or for the specified time or more, in an upper direction from the start point, the control module 180 determines a direction of the user operation as the upper direction. As shown in FIG. 3D, if the user operation is ended after being detected with the specified length or more, or for the specified time or more, in a lower direction from the start point, the control module 180 determines a direction of the user operation as the lower direction. As shown in FIG. 3E, if the user operation is ended after being detected with the specified length or more, or for the specified time or more, in a right upper direction from the start point, the control module 180 determines a direction of the user operation as the right upper direction. As shown in FIG. 3F, if the user operation is ended after being detected with the specified length or more, or for the specified time or more in a left lower direction from the start point, the control module 180 determines a direction of the user operation as the left lower direction. As shown in FIG. 3G, if the user operation is ended after being detected with the specified length or more, or for the specified time or more, in a left upper direction from the start point, the control module 180 determines a direction of the user operation as the left upper direction. As shown in FIG. 3H, if the user operation is ended after being detected with the specified length or more, or for the specified time or more, in a right lower direction from the start point, the control module 180 determines a direction of the user operation as the right lower direction.

FIGS. 4A to 4H are diagrams illustrating the determination of a direction of a user operation, according to an embodiment of the present disclosure. Particularly, in FIGS. 4A to 4H, a user inputs a plurality of directions using a single user operation.

Figure 4A:
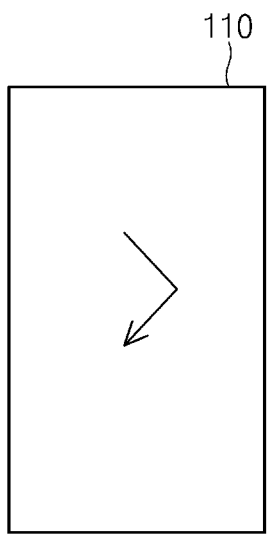
FIGS. 4A, 4B, 4C, 4D, 4E, 4F, 4G, and 4H are diagrams illustrating the determination of a direction of a user operation, according to an embodiment of the present disclosure.
Figure 4B:
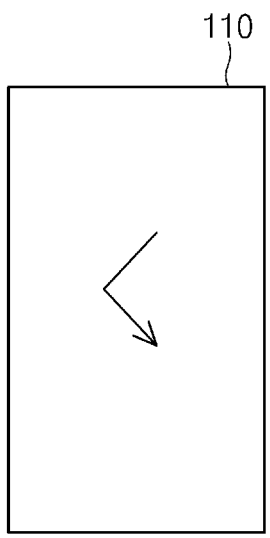
Figure 4C:
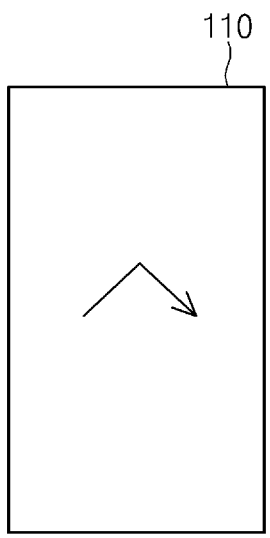
Figure 4D:
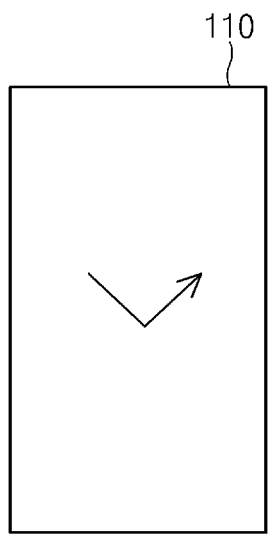
Figure 4E:
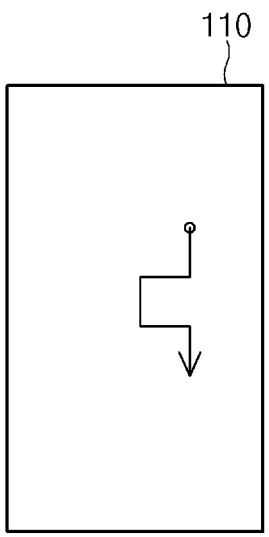
Figure 4F:
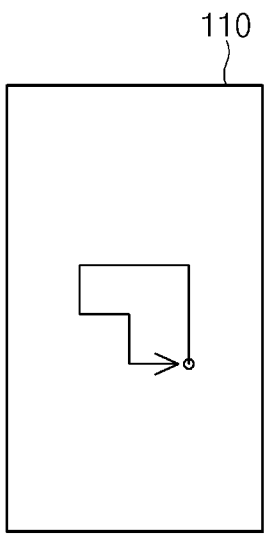
Figure 4G:
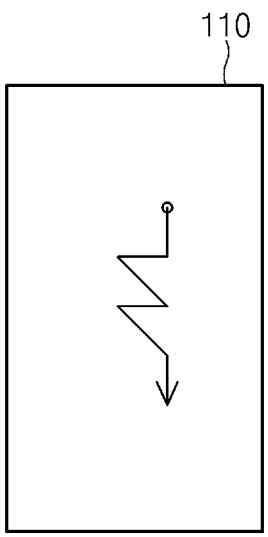
Figure 4H:
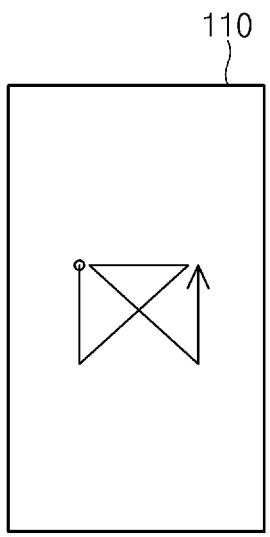

FIGS. 4A to 4H illustrate various examples of a user operation detected by the input module 110 (e.g., the touch sensor panel 111) of FIG. 1. According to an embodiment of the present disclosure, after one user operation is input with a specified length or more, or for a specified time or more in a first direction, if a user operation is subsequently input with a specified length or more, or for a specified time or more in a second direction, a control module 180 of FIG. 1 determines that a plurality of user operations are subsequently input in the first direction and the second direction. For one example, if a user operation shown in FIG. 4A is detected, the control module 180 determines that a user operation of a right lower direction and a user operation of a left lower direction are subsequently input. If a user operation shown in FIG. 4B is detected, the control module 180 determines that a user operation of a left lower direction and a user operation of a right lower direction are subsequently input. If a user operation shown in FIG. 4C is detected, the control module 180 determines that a user operation of a right upper direction and a user operation of a right lower direction are subsequently input. If a user operation shown in FIG. 4D is detected, the control module 180 determines that a user operation of a right lower direction and a user operation of a right upper direction are subsequently input. If a user operation shown in FIG. 4E is detected, the control module 180 determines that a user operation of a lower direction, a user operation of a left direction, a user operation of a lower direction, a user operation of a right direction, and a user operation of a lower direction are subsequently input. If a user operation shown in FIG. 4F is detected, the control module 180 determines that a user operation of an upper direction, a user operation of a left direction, a user operation of a lower direction, a user operation of a right direction, a user operation of a lower direction, and a user operation of a right direction are subsequently input. If a user operation shown in FIG. 4G is detected, the control module 180 determines that a user operation of a lower direction, a user operation of a left direction, a user operation of a right lower direction, a user operation of a left direction, a user operation of a right lower direction, and a user operation of a lower direction are subsequently input. If a user operation shown in FIG. 4H is detected, the control module 180 determines that a user operation of a lower direction, a user operation of a right upper direction, a user operation of a left direction, a user operation of a right lower direction, and a user operation of an upper direction are subsequently input. According to an embodiment of the present disclosure, a user operation may include a user operation input within a specific distance from the touch sensor panel 111, as well as a user operation directly provided to the touch sensor panel 111.

Figure 5A:
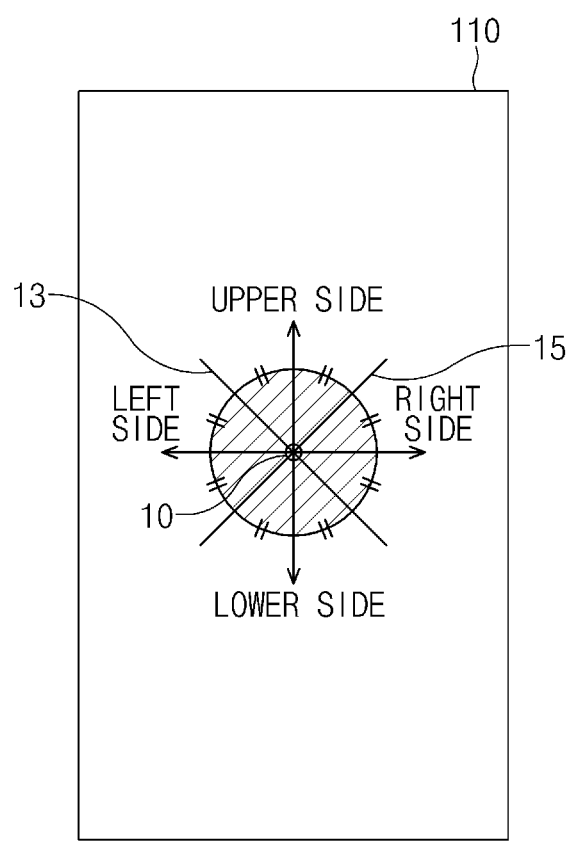
FIGS. 5A and 5B are diagrams illustrating the determination of a direction of a user operation, according to an embodiment of the present disclosure.
Figure 5B:
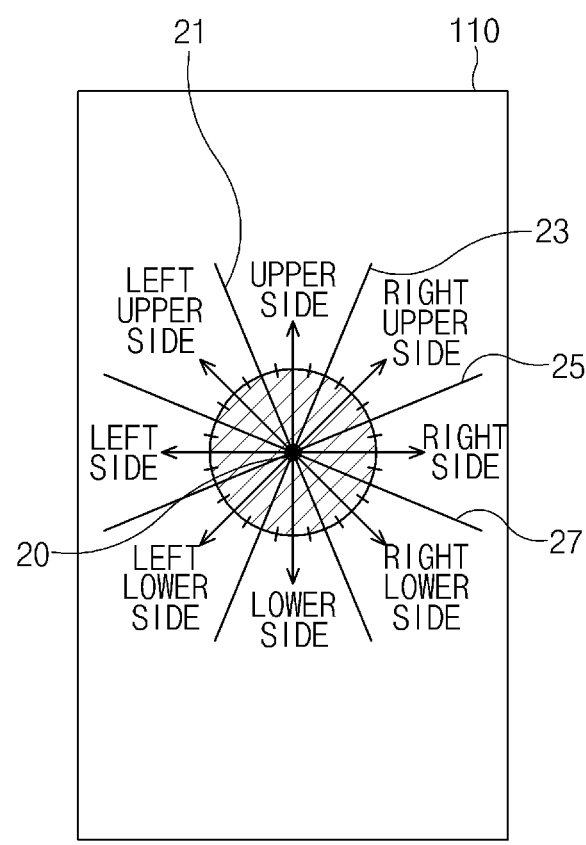

FIGS. 5A and 5B are diagrams illustrating the determination of a direction of a user operation, according to an embodiment of the present disclosure. Particularly, FIGS. 5A and 5B illustrate criteria for determining a direction of a user operation.

FIG. 5A illustrates criteria for determining a direction, if the number of recognizable directions is four. Referring to FIG. 5A, the input module 110 (e.g., the touch sensor panel 111) is classified into four regions by two straight lines 13 and 15, and each of the classified four regions include a single direction. Thereafter, if a position of the user operation is changed, the changed user operation is located on one of the four regions. The control module 180 determines a direction of the user operation based on the region in which it is located. Specifically, the control module 180 determines that the user operation moves in a direction of a region in which the changed user operation is located. If a position of the user operation is changed, the input module 110 (e.g., the touch sensor panel 111) is classified into four new regions relative to the changed position. The control module 180 may determine a direction, in which the user operation moves, again relative to the newly classified regions. The control module 180 may sequentially determine directions, in which the user operation moves, using the above-described method. If a user operation is subsequently detected with a specified length or more, or for a specified time or more, in a specific direction, the control module 180 may determine that the user operation is input in the specific direction.

FIG. 5B is a diagram illustrating criteria for determining a direction if the number of recognizable directions is eight. Referring to FIG. 5B, the input module 110 (e.g., the touch sensor panel 111) is classified into eight regions by four straight lines 21, 23, 25, and 27, and each of the classified eight regions include a single direction. Thereafter, if a position of the user operation is changed, the changed user operation is located in one of the eight regions. The control module 180 determines a direction of a user operation based on region in which the changed user operation is located. Specifically, the control module 180 determines that the user operation moves in a direction of a region in which the changed user operation is located. If a position of the user operation is changed, the input module 110 (e.g., the touch sensor panel 111) is classified into eight new regions relative to the changed position. The control module 180 may determine a direction, in which the user operation moves, again relative to the newly classified regions. The control module 180 may sequentially determine directions, in which the user operation moves, using the above-described method. If a user operation is subsequently detected with a specified length or more, or for a specified time or more in a specific direction, the control module 180 may determine that the user operation is input in the specific direction.

Figure 6:
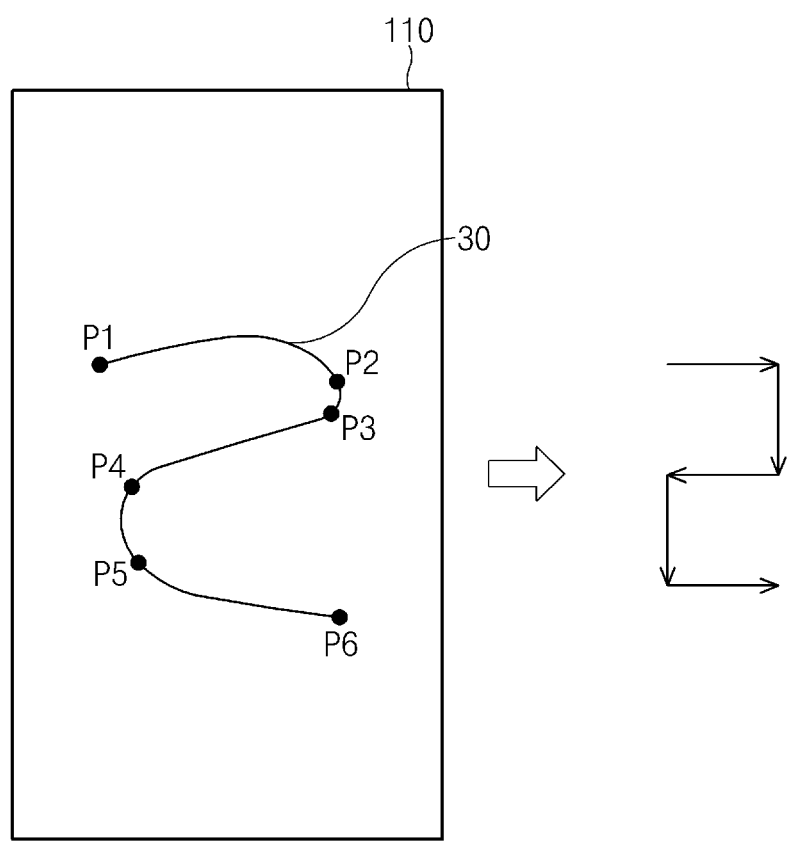
FIG. 6 is a diagram illustrating the determination of a direction of a user operation, according to an embodiment of the present disclosure.

FIG. 6 is a diagram illustrating the determination of a direction of a user operation, according to an embodiment of the present disclosure. Particularly, FIG. 6 is a diagram illustrating detection of a user operation in a curved form.

FIG. 6 illustrates a user operation 30 in a curved form detected by the input module 110 (e.g., the touch sensor panel 111 of FIG. 1). The user operation 30 is detected from an initial point P1, through points P2 to P5, to a final point P6. As described with reference to FIG. 5A, the control module 180 of FIG. 1 determines a direction of a user operation relative to whether a changed user operation is located in a specific region. For example, since a user operation from the point P1 to the point P2 moves within a region of a right direction, the control module 180 determines that a user operation of the right direction from the point P1 to the point P2 is input. Since a user operation from the point P2 to the point P3 moves within a region of a lower direction, the control module 180 determines that a user operation of the lower direction from the point P2 to the point P3 is input. Since a user operation from the point P3 to the point P4 moves within a region of a left direction, the control module 180 determines that a user operation of the left direction from the point P3 to the point P4 is input. Since a user operation from the point P4 to the point P5 moves within a region of a lower direction, the control module 180 determines that a user operation of the lower direction from the point P4 to the point P5 is input. Since a user operation from the point P5 to the point P6 moves within a region of a right direction, the control module 180 determines that a user operation of the right direction from the point P5 to the point P6 is input.

Figure 7A:
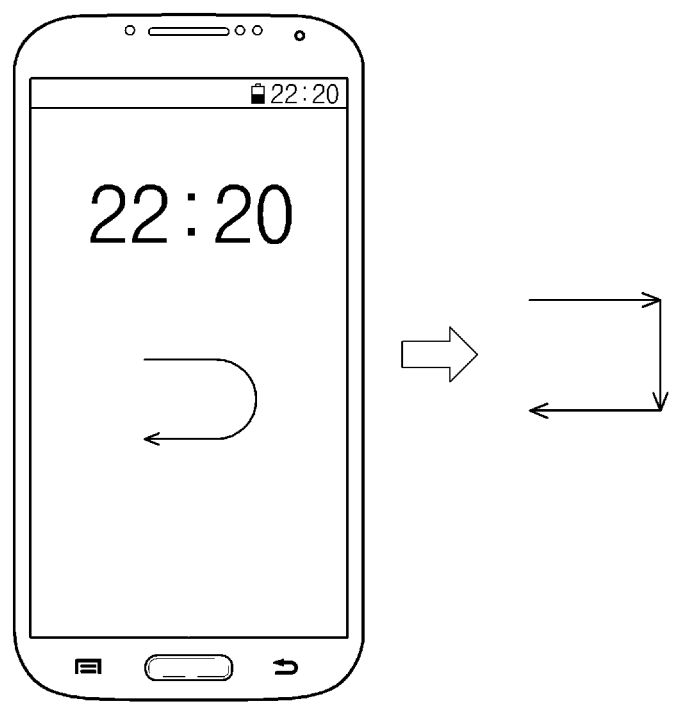
FIGS. 7A and 7B are drawings illustrating the determination of a direction of a user operation, according to an embodiment of the present disclosure.
Figure 7B:
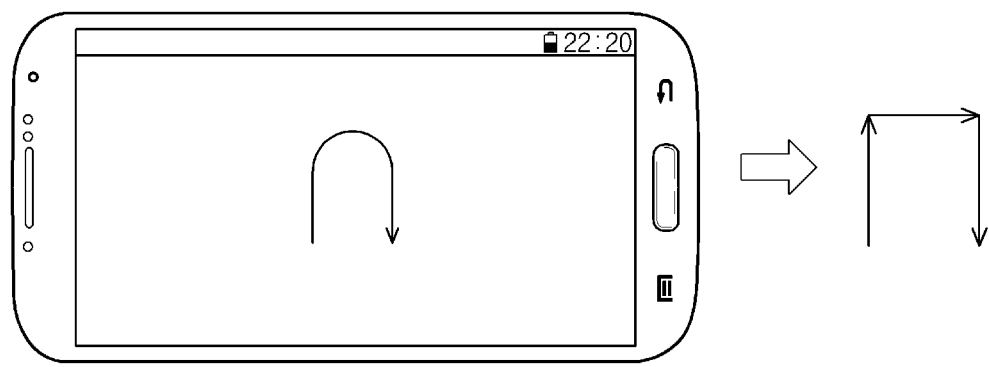

FIGS. 7A and 7B are diagrams illustrating the determination of a direction of a user operation, according to an embodiment of the present disclosure. Particularly, FIGS. 7A and 7B are drawings illustrating the determination of a direction of a user operation relative to content displayed on a display.

According to an embodiment of the present disclosure, the electronic device 100 includes the display 150 of FIG. 1 on its front surface. The control module 180 of FIG. 1 determines a direction of a user operation relative to content displayed on the display 150. For example, the control module 180 determines a direction of a user operation based on a direction of content (e.g., an image or text) displayed on the display 150. Referring to FIG. 7A, the control module 180 determines that a user operation of a right direction, a user operation of a lower direction, and a user operation of a left direction are sequentially input relative to content displayed on the display 150. Referring to FIG. 7B, the control module 180 determines that a user operation of an upper direction, a user operation of a right direction, and a user operation of a lower direction are sequentially input relative to content displayed on the display 150. When FIGS. 7A and 7B are compared, although a user operation is input to the same positions, the control module 180 determines a direction of the user operation in a different manner based on a display direction of content.

Figure 8:
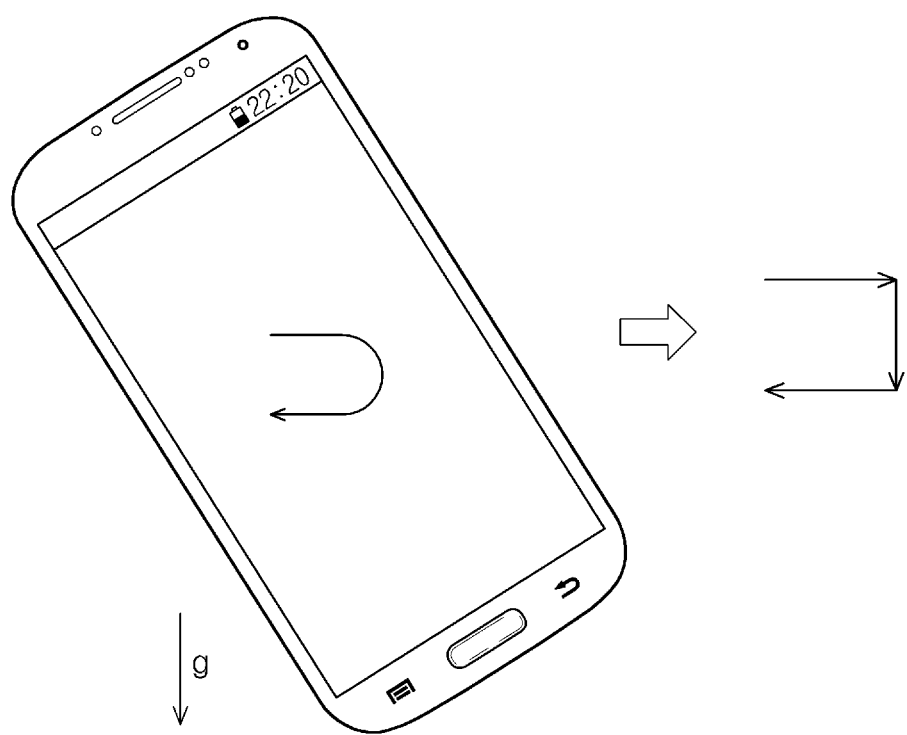
FIG. 8 is a diagram illustrating the determination of a direction of a user operation, according to an embodiment of the present disclosure.

FIG. 8 is a diagram illustrating the determination of a direction of a user operation, according to an embodiment of the present disclosure. Particularly, FIG. 8 is a diagram illustrating the determination of a direction of a user operation relative to a direction of gravity.

According to an embodiment of the present disclosure, the control module 180 of FIG. 1 determines a direction of a user operation relative to a direction of gravity. For example, the control module 180 reflects a vector indicating the direction of gravity to a plane formed by the input module 110 (e.g., the touch sensor panel 111) of FIG. 1, and determines a direction of the reflected vector as a lower direction. Referring to FIG. 8, a user operation is detected in a state where an upper portion of the electronic device 100 is tilted to a left side. The control module 180 determines that a user operation of a right direction, a user operation of a lower direction, and a user operation of a left direction are sequentially input relative to the direction of gravity.

According to an embodiment of the present disclosure, when determining a direction of a user operation, the control module 180 may correct an angle of the user operation using a tilt value of the electronic device 100. For example, if a user operation is detected in a state where the plane formed by the input module 110 (e.g., the touch sensor panel 111) is tilted to a left or right side by a specific angle, the control module 180 may rotate the detected user operation by the tilted angle and may determine a direction of the user operation.

Figure 9:
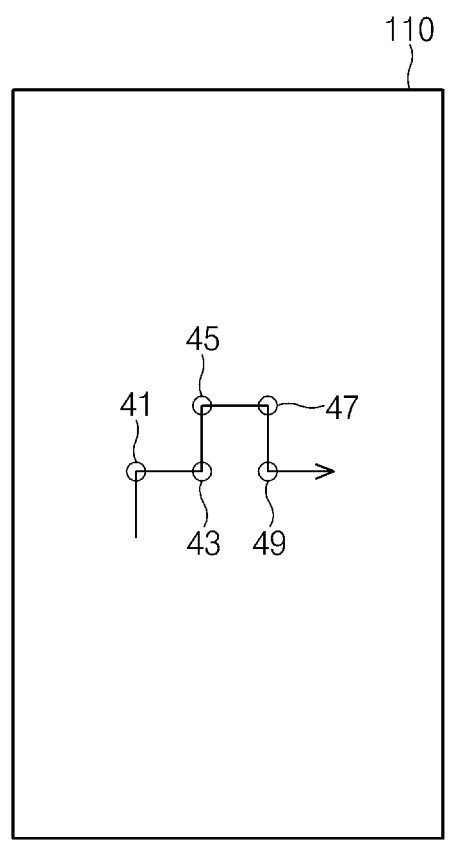
FIG. 9 is a diagram illustrating the determination of a change of an angle of a user operation, according to an embodiment of the present disclosure.

FIG. 9 is a drawing illustrating the determination of a change of an angel of a user operation, according to an embodiment of the present disclosure.

According to an embodiment of the present disclosure, the control module 180 of FIG. 1 analyzes a user operation detected by an input module 110 and determines a change of an angle of the user operation. For example, if a direction of the user operation is changed from a first direction to a second direction, the control module 180 determines a change of an angle defined by the first direction and the second direction.

In FIG. 9, a user operation detected by the input module 110 (e.g., a touch sensor panel 111 of FIG. 1). Referring to FIG. 9, it is known that a user operation of an upper direction, a user operation of a right direction, a user operation of an upper direction, a user operation of a right direction, a user operation of a lower direction, and a user operation of a right direction are subsequently detected, and that a direction of the user operation is changed a total of five times. The control module 180 determines a change of an angle of a user operation with respect to each of the direction changes. For example, in a 2D coordinate system, the control module 180 determines a relative angle change between the direction of the user operation before being changed and the direction of the user operation after being changed. Specifically, the control module 180 determines a relative angle change of a vector indicating the direction of the user operation before being changed and the direction of the user operation after being changed.

Referring to FIG. 9, since a first direction change 41 is a change from an upper direction of a user operation to a right direction of the user operation, that is, since the first direction change 41 is a change from 90 degrees to 0 degree, the control module 180 determines that the first direction change 41 is minus 90 degrees. Since a second direction change 43 is a change from a right direction to an upper direction, that is, since the second direction change 43 is a change from 0 degree to 90 degrees, the control module 180 determines that the second direction change 43 is plus 90 degrees. Since a third direction change 45 is a change from an upper direction to a right direction, that is, since the third direction change 45 is a change from 90 degrees to 0 degree, the control module 180 determines that the third direction change 45 is minus 90 degrees. Since a fourth direction change 47 is a change from a right direction to a lower direction, that is, since the fourth direction change 47 is a change from 0 degrees to 270 degrees (or minus 90 degrees), the control module 180 determines that the fourth direction change 47 is minus 90 degrees. Since a fifth direction change 49 is a change from a lower direction to a right direction, that is, since the fifth direction change 49 is a change from 270 degrees to 0 degree, the control module 180 determines that the fifth direction change 49 is plus 90 degrees. Therefore, the control module 180 determines that angles are sequentially changed to minus 90 degrees, plus 90 degrees, minus 90 degrees, minus 90 degrees, and plus 90 degrees, with respect to the user operation shown in FIG. 9.

Figure 10A:
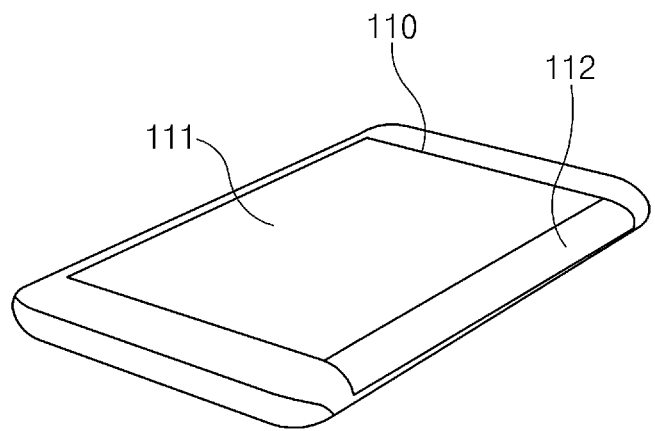
FIGS. 10A and 10B are diagrams illustrating the determination of a detecting region of a user operation, according to an embodiment of the present disclosure.
Figure 10B:
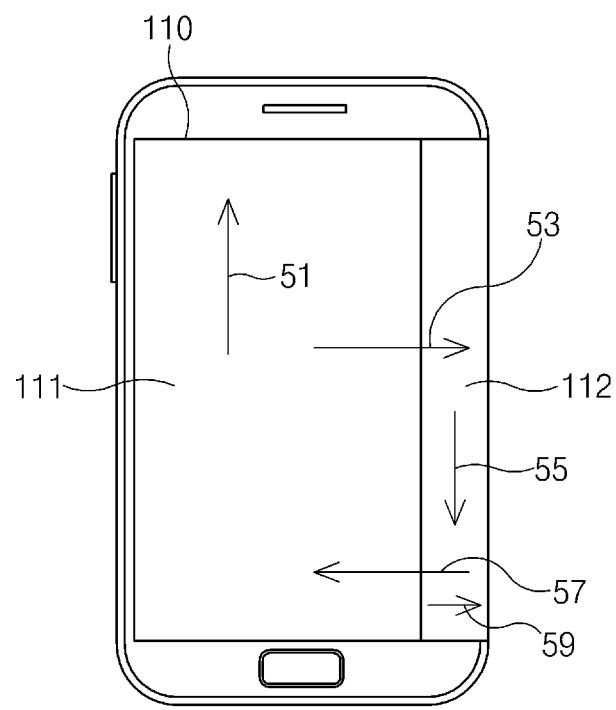

FIGS. 10A and 10B are drawings illustrating the determination of a detecting region of a user operation, according to an embodiment of the present disclosure.

According to an embodiment of the present disclosure, the control module 180 of FIG. 1 determines a detecting region of a user operation. For example, the input module 110 (e.g., the touch sensor panel 111 of FIG. 1) includes a plurality of regions. The control module 180 determines whether a user operation is detected on any one of a plurality of regions. In another example, if a user operation is detected throughout a plurality of regions, the control module 180 determines an order of regions where the user operation is detected.

Referring to FIG. 10A, the input module 110 is classified into a plurality of regions. For example, the input module 110 includes a first region 111 and a second region 112. According to an embodiment of the present disclosure, the second region 112 corresponds to a right edge of the display 150 of FIG. 1.

Referring to FIG. 10B, the control module 180 determines a region where a user operation that input to the input module 110 is detected. For example, if a first user operation 51 is detected, the control module 180 determines that the first user operation 51 is input in an upper direction in the first region 111 of the input module 110. If the second user operation 53 is detected, the control module 180 determines that the second user operation 53 is input in a right direction in the first region 111 and the second region 112, and is input in order from the first region 111 to the second region 112 (or in the right direction). If the third user operation 55 is detected, the control module 180 determines that the third user operation 55 is input in a lower direction in the second region 112. If the fourth user operation 57 is detected, the control module 180 determines that the fourth user operation 57 is input in a left direction in the first region 111 and the second region 112, and is input in order from the second region 112 to the first region 111 (or in the left direction). If the fifth user operation 59 is detected, the control module 180 determines that the fifth user operation 59 is input in a right direction in the second region 112. The scope and spirit of the present disclosure is not limited to that which is shown in FIG. 10B. For example, the input module 110 may receive various user operations other than those shown in FIG. 10.

Figure 11:
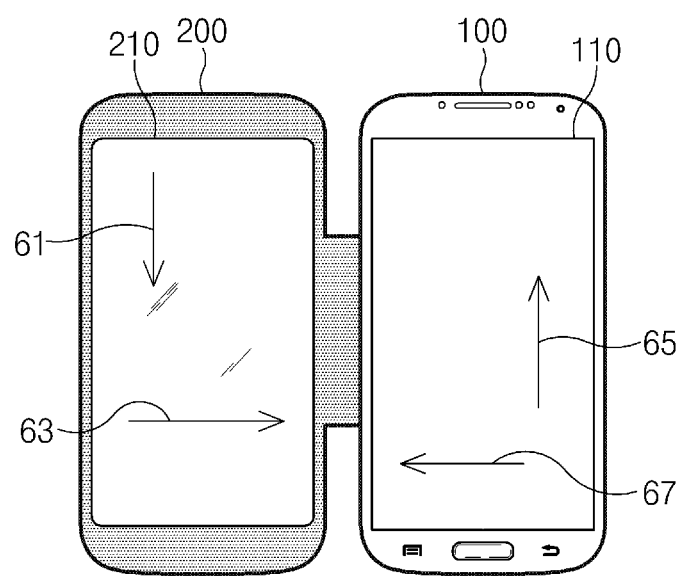
FIG. 11 is a diagram illustrating the determination of a device to which a user operation is input, according to an embodiment of the present disclosure.

FIG. 11 is a drawing illustrating the determination of a device to which a user operation is input, according to an embodiment of the present disclosure.

Referring to FIG. 11, the electronic device 100 is coupled to a case device 200. According to an embodiment of the present disclosure, the case device 200 includes a separate input module 210. According to an embodiment of the present disclosure, the input module 210 included in the case device 200 may include a touch sensor panel, which senses a touch operation of a user and a pen sensor panel, which senses a pen operation of the user. The electronic device 100 connects with the input module 210 of the case device 200 through the communication module 130 shown in FIG. 1. The communication module 130 receives a user operation detected by the input module 210 of the case device 200. For example, if the input module 210 of the case device 200 is a touch sensor panel or a pen sensor panel, the communication module 130 may receive a coordinate value input by a touch operation or a pen operation of the user.

According to an embodiment of the present disclosure, the control module 180 of FIG. 1 determines a type of a device (or the input module 110) to which a user operation is input. For example, the control module 180 may determine whether a currently detected user operation is detected by the touch sensor panel 111 a gesture sensor 115 of FIG. 1. In another example, the control module 180 may determine whether a currently detected user operation is detected by the input module 110 included in the electronic device 100 or the input module 210 included in the case device 200. If a first user operation 61 is detected, the control module 180 determines that the first user operation 61 is input to the input module 210 included in the case device 200 in a lower direction. If a second user operation 63 is detected, the control module 180 determines that the second user operation 63 is input to the input module 210 included in the case device 200 in a right direction. If a third user operation 65 is detected, the control module 180 determines that the third user operation 65 is input to the input module 110 included in the electronic device 100 in an upper direction. If a fourth user operation 67 is detected, the control module 180 determines that the fourth user operation 67 is input to the input module 110 included in the electronic device 100 in a left direction.

FIGS. 12A, 12B, 12C, and 12D are diagrams illustrating the display of a guide corresponding to a user operation, according to an embodiment of the present disclosure.

Referring to FIG. 12A, the control module 180 of FIG. 1 displays a guide 71 that assists in inputting a user operation on the display 150 in response to a position where a user operation is initially detected. According to an embodiment of the present disclosure, the guide 71 includes directions guides 73 that inform a user of recognizable directions. For example, if the number of recognizable direction is eight, as shown in FIG. 12A, the display 150 displays the eight direction guides 73 corresponding to eight directions relative to a detected position of a user operation. According to an embodiment of the present disclosure, if a user operation moves from an initial position to a position where the direction guides 73 are displayed, the control module 180 determines that the user operation is input in a specific direction.

Referring to FIG. 12B, if a position of a user operation is changed, the control module 180 controls the display 150 to display the guide 71 in response to the changed position. According to an embodiment of the present disclosure, if a detecting position of a user operation is changed, the control module 180 controls the display 150 such that the guide 71 disappears. If a user operation is input having a specified length or more in a specific direction, the control module 180 controls the display 150 to display an object 75 at a changed position.

Referring to FIGS. 12C and 12D, if a user operation is subsequently input, the control module 180 controls the display 150 to trace a position where a user operation is detected and to continuously display the guide 71 on the corresponding position.

Referring to FIGS. 12B to 12D, if a user operation is subsequently input, the control module 180 controls the display 150 to display the object 75 indicating a path (or a direction) in which the user operation is input. For example, the control module 180 controls the display 150 to display an input path of a user operation using a line.

According to an embodiment of the present disclosure, the control module 180 performs a specific operation according to a direction combination of a user operation. For example, the control module 180 may unlock the electronic device 100 of FIG. 1 according to a direction of a user operation. In another example, the control module 180 may execute a specific application (e.g., a camera application or a messaging application) according to a direction of a user operation. In another example, the control module 180 may unlock the electronic device 100 according to a direction of a user operation. If the electronic device 100 is unlocked, the control module 180 may execute a specific application. Alternatively, the control module 180 may unlock various accounts of the electronic device 100 according to a direction of a user operation.

According to an embodiment of the present disclosure, the control module 180 may compare information about a direction combination of a user operation with information about at least one direction combination, which is previously stored in the memory 120 of FIG. 1 and may perform an operation corresponding to the same direction combination. For example, the control module 180 may compare information about a direction and an input order of a user operation with information about a direction and an input order of an user operation, which is stored in the memory 120, and may perform an operation corresponding to the same direction combination, that is, the same direction and the same input order. In another example, the control module 180 may compare information about a direction, an input order, and a detecting region of a user operation with information about a direction, an input order, and a detecting region of a user operation, which is stored in the memory 120, and may perform an operation corresponding to the same direction combination, that is, the same direction, the same input order, and the same detecting region. In another example, the control module 180 may compare information about a direction, an input order, and an input device of a user operation with information about a direction, an input order, and an input device of a user operation, which is stored in the memory 120, and may perform an operation corresponding to the same direction combination, that is, the same direction, the same input order, and the same input device.

According to an embodiment of the present disclosure, when comparing directions of user operations among direction combinations, the control module 180 may compare only the directions of the user operations irrespective of a length (or a rate) of a user operation detected by the input module 110 and a length (or a rate) of a user operation input to be stored in the memory 120, and may determine whether direction combinations are the same as each other.

According to an embodiment of the present disclosure, the control module 180 may perform a specific operation according to an angle change of a user operation. For example, the control module 180 may compare an angle change of a user operation and an order of the angle change with an angle change of a specified user operation and an order of the angle change and may perform a specific operation according to whether the angle changes of the user operations and the orders of the angle changes are the same as each other.

According to an embodiment of the present disclosure, if information about a direction combination input by a user is not the same as information about a direction combination, which is stored in the memory 120, a specified number of times or more, the control module 180 may receive a personal identification number (PIN) and may perform a specific operation. For example, if unlocking of the electronic device 100 using a direction combination fails a specified number of times or more, the control module 180 may control the display 150 to display a user interface for reception of a PIN.

According to an embodiment of the present disclosure, a method of determining a direction of a user operation may be set by the user. For example, the user may set whether to recognize only one direction or a plurality of directions using a single user operation. In another example, the user may set whether to determine a direction of a user operation according to a position where the user operation moves or to determine a direction of a user operation using a shape in which the user operation is detected. In another example, the user may set the number of recognizable directions (e.g. four or eight). For another example, the user may set a region to which a user operation may be input.

According to an embodiment of the present disclosure, a method of determining whether direction combinations are the same as each other may be set by the user. For example, when determining whether direction combinations are the same as each other, the user may set whether the determination is made in consideration of a region where a user operation is detected or without considering the region where the user operation is detected. In another example, when determining whether direction combinations are the same as each other, the user may set whether the determination is made in consideration of a user operation received from an external input device or without considering a user operation received from the external input device.

According to an embodiment of the present disclosure, an object, an audio, or a vibration provided to the user, according to recognition of a direction of a user operation, may be set by the user. For example, the user may set whether to receive an object, an audio, or a vibration. In another example, the user may set a type of an object, an audio, or a vibration to be received.

FIGS. 13A to 13D are diagrams illustrating an operation of displaying an object corresponding to a direction of a user operation, according to an embodiment of the present disclosure.

In FIGS. 13A to 13D, an object is displayed on the display 150 of FIG. 1, if user operations shown in FIGS. 2A to 2D are input. Referring to FIG. 13A, as shown in FIG. 2A, if a user operation of a right direction is input, the control module 180 of FIG. 1 controls the display 150 to display an icon object 81, such as an arrow in the right direction, indicating a direction of the user operation. Alternatively, the control module 180 controls the display 150 to display a text object 82, "the right direction is input", for informing the user of a direction of the user operation. Referring to FIG. 13B, as shown in FIG. 2B, if a user operation of a left direction is input, the control module 180 controls the display 150 to display an icon object 83, such as an arrow in the left direction, indicating a direction of the user operation. Alternatively, the control module 180 controls the display 150 to display a text object 84, "the left direction is input", for informing the user of a direction of the user operation. Referring to FIG. 13C, as shown in FIG. 2C, if a user operation of an upper direction is input, the control module 180 controls the display 150 to display an icon object 85, such as an arrow in the upper direction, indicating a direction of the user operation. Alternatively, the control module 180 controls the display 150 to display a text object 86, "the upper direction is input", for informing the user of a direction of the user operation. Referring to FIG. 13D, as shown in FIG. 2D, if a user operation of a lower direction is input, the control module 180 controls the display 150 to display an icon object 87, such as an arrow in the lower direction, indicating a direction of the user operation. Alternatively, the control module 180 may control the display 150 to display a text object 88, "the lower direction is input", for informing the user of a direction of the user operation.

According to an embodiment of the present disclosure, the control module 180 may change an unlock mode of the electronic device 100 according to context information of the electronic device 100, which is obtained by the communication module 130 or the sensor module 140 of FIG. 1. The context information may include, for example, at least one of a position of the electronic device 100, a motion of the electronic device 100, information about whether the electronic device 100 is mounted on a vehicle, or a visibility of the display 150 included in the electronic device 100.

According to an embodiment of the present disclosure, the control module 180 may determine whether the context information of the electronic device 100 corresponds to a specified condition. The control module 180 may determine whether a position of the electronic device 100 corresponds to a specified position using current GPS information or serving cell identification information. The control module 180 may determine whether the electronic device 100 is located in a specific space (or an office or home) using AP identification information. The control module 180 may determine whether the electronic device 100 is in a moving state using motion information of the electronic device 100. The control module 180 may determine whether the electronic device 100 is in a state where the electronic device 100 is mounted on a vehicle (or whether the user is in a driving state) using vehicle information. The control module 180 may determine visibility of the display 150 using brightness information around the electronic device 100 and brightness information of the display 150. The brightness information around the electronic device may be measured by the illumination sensor 145 of FIG. 1. For example, if an area around the electronic device 100 is dark and if the display 150 is bright, the control module 180 may determine that visibility is high. In another example, if an area around the electronic device 100 is bright and if the display 150 is dark, the control module 180 may determine that visibility is low. The control module 180 may compare brightness around the electronic device 100 with brightness of the display 150 and may determine whether difference between the brightness around the electronic device 100 and the brightness of the display 150 is greater than or equal to a specified value. The control module 180 may determine whether a specified person (e.g., a family member) exists around the electronic device 100 using an image around the electronic device 100. The control module 180 may verify an external electronic device using an indoor positioning system and may determine whether a specified person (e.g., a colleague) mapped with the external device exists around the electronic device 100.

If it is determined that context information corresponds to a specified condition, the control module 180 may change an unlock mode of the electronic device 100 from a first mode to a second mode. For example, the first mode may be an unlock mode (or a PIN mode) using a PIN or an unlock mode (or a point mode) using a specified number of points (e.g., nine points). The second mode may be an unlock mode (or a direction mode) using a direction combination. In another example, the first mode may be a lock mode using a direction combination, and the second mode may be a lock mode using a PIN.

According to various embodiments of the present disclosure, the control module 180 may continuously change an unlock mode of the electronic device 100 according to context information of the electronic device 100. If it is determined that the electronic device 100 is located in a user's home, the control module 180 may operate in the unlock mode using the direction mode which has a relatively low secure level. If it is determined that the electronic device 100 is located in a user's company, the control module 180 may operate in the point mode or the PIN mode, which has a relatively high secure level. If visibility of the display 150 is high, the control module may operate in the PIN mode or the point mode, which requests to be input to an accurate position. If the visibility of the display 150 is low, the control module may operate in the direction mode unnecessary for an accurate input. If the electronic device 100 is in a state where the electronic device 100 is mounted on a vehicle (or if the user is in a driving state), since the control module 180 does not request that the user perform an accurate input, the control module 180 may operate in the direction mode. If the electronic device 100 is not in the state where the electronic device 100 is mounted on the vehicle, the control module 180 may operate in the PIN mode or the point mode. If it is determined that the user is in a walking or running state, the control module 180 may operate in the direction mode. If it is determined that the user is in a stop state, the control module 180 may operate in the PIN mode or the point mode. If it is determined that a family member exists around the electronic device 100, the control module 180 may operate in the direction mode, which has a relatively low secure level. If it is determined that a colleague or a friend is located around the electronic device 100, the control module 180 may operate in the PIN mode or the point mode which has a relatively high secure level.

FIGS. 14A to 14F and FIGS. 15A to 15F are diagrams illustrating a user interface displayed on a display, according to embodiments of the present disclosure.

Figure 14A:
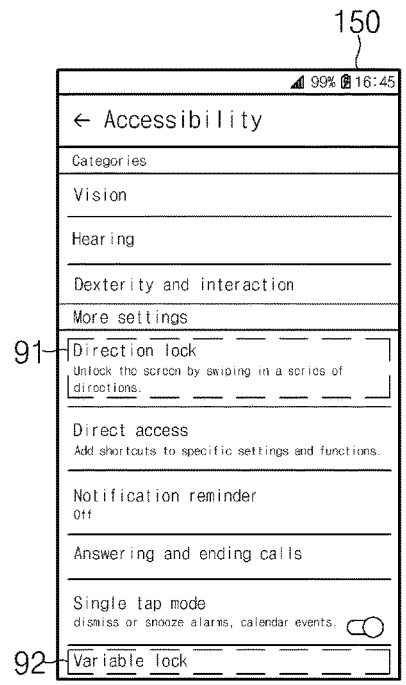
FIGS. 14A, 14B, 14C, 14D, 14E, and 14F and FIGS. 15A, 15B, 15C, 15D, 15E, and 15F are diagrams illustrating a user interface displayed on a display, according to an embodiment of the present disclosure.
Figure 14B:
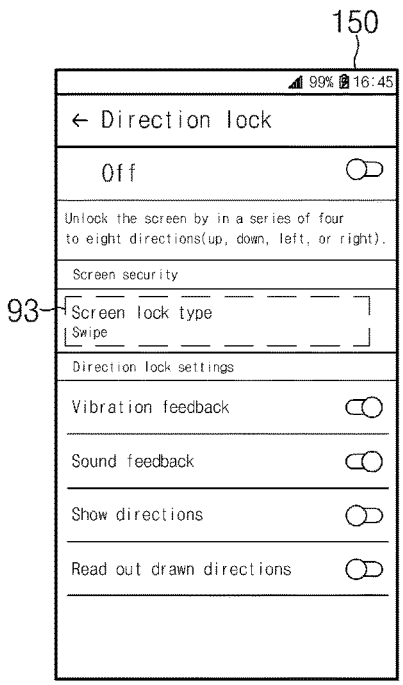
Figure 14C:
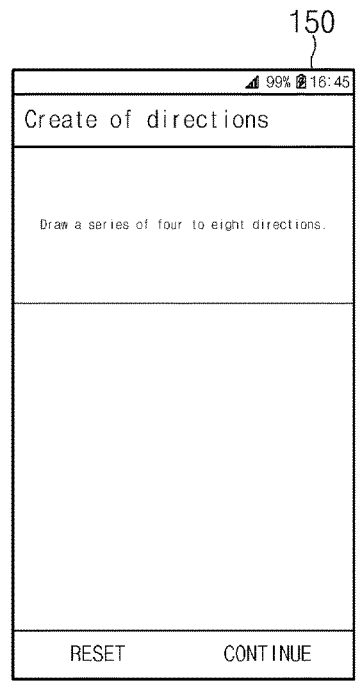
Figure 14D:
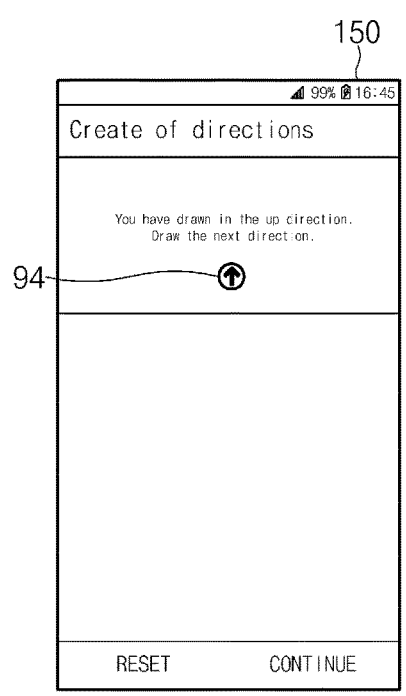
Figure 14E:
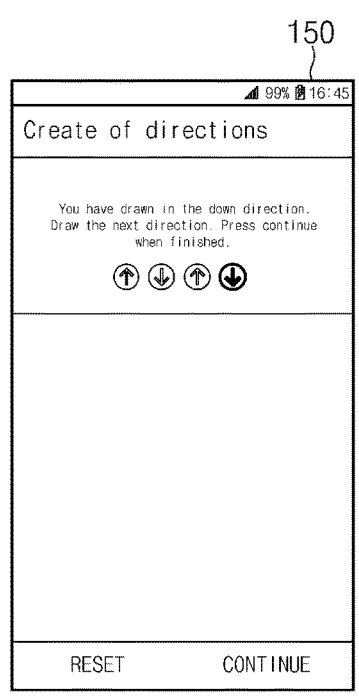
Figure 14F:
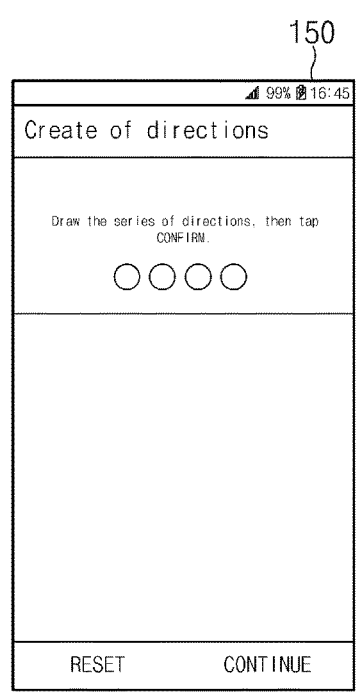

Referring to FIG. 14A, the display 150 of FIG. 1 displays a user interface including an environment setup menu of the electronic device 100 of FIG. 1. The user interface includes a direction mode menu 91 for setting a direction unlock mode (or a direction mode), and a setup menu 92 for setting a variable unlock mode (or a variable mode). If a user selects the direction mode menu 91, the display 150 displays a user interface shown in FIG. 14B. The user interface shown in FIG. 14B includes various menus associated with the direction mode. For example, the user interface includes a setup menu 93 for setting a direction combination. If the user selects the setup menu 93, the display 150 displays a user interface shown in FIG. 14C. If the user inputs a user operation for setting a direction combination, the display 150 displays a user interface shown in FIG. 14D. Referring to FIG. 14D, the user interface includes an object 94 indicating a direction of an input user operation. If the user additionally inputs a user operation for setting a direction combination, the display 150 displays a user interface shown in FIG. 14E. Referring to FIG. 14E, the user interface displays directions of user operations, input up to now, in order. After a user operation is input, if the user selects a "continue" button, the display 150 displays a user interface, shown in FIG. 14F, for requesting him or her to input a direction combination again. If the user inputs the direction combination again, the display 150 displays a user interface, shown in FIG. 15A, for setting a PIN. If the user enters a PIN, the display 150 displays a user interface, shown in FIG. 15B, the user to enter the PIN again. If the user enters the PIN again, the display 150 displays a user interface, shown in FIG. 15C, including a menu associated with the direction mode.

Figure 15A:
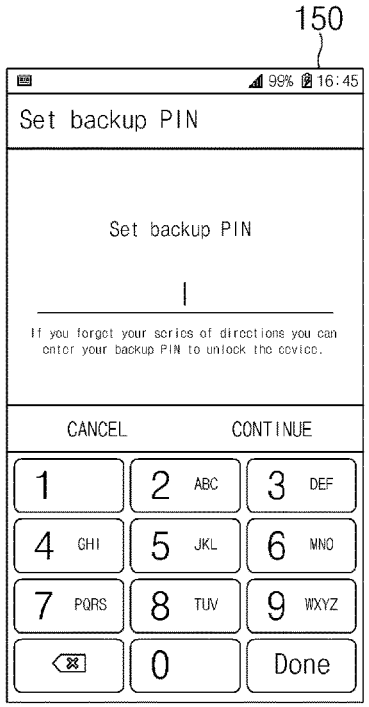
Figure 15B:
Figure 15C:
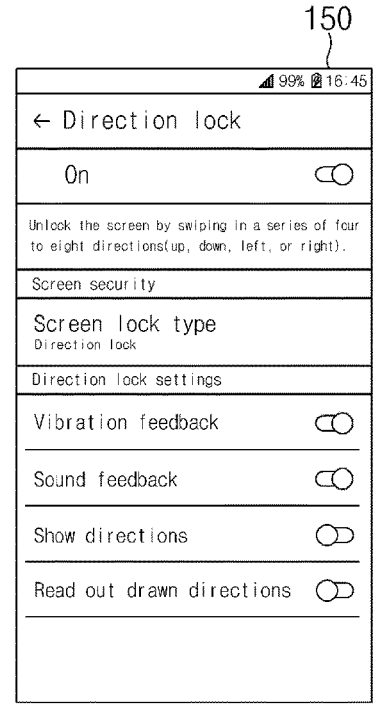
Figure 15D:
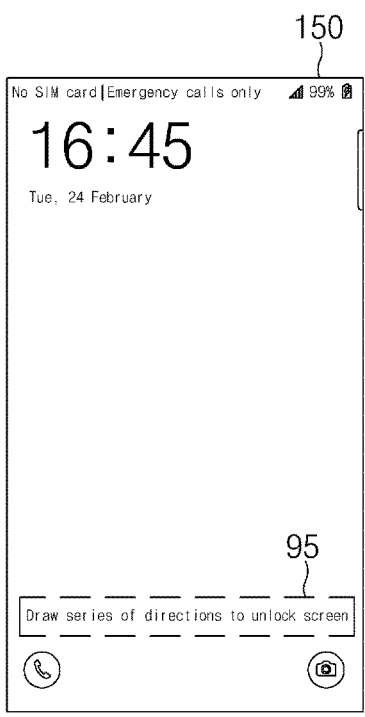
Figure 15E:
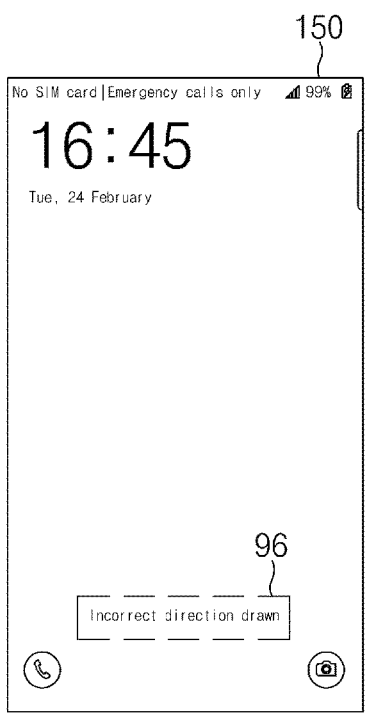

If the electronic device 100 enters a lock state in a state where an unlock mode of the electronic device 100 is set to the direction mode, the display 150 displays a user interface shown in FIG. 15D. Referring to FIG. 15D, the user interface includes a message 95 for requesting the user to input a direction to unlock the electronic device 100. The user may input a user operation corresponding to a direction combination set through the user interface shown in FIG. 15D. If the direction combination input by the user is different from a specified direction combination, the display 150 displays a user interface shown in FIG. 15E. Referring to FIG. 15E, the user interface includes a message 96 for informing the user that an incorrect direction combination is input.

Figure 15F:
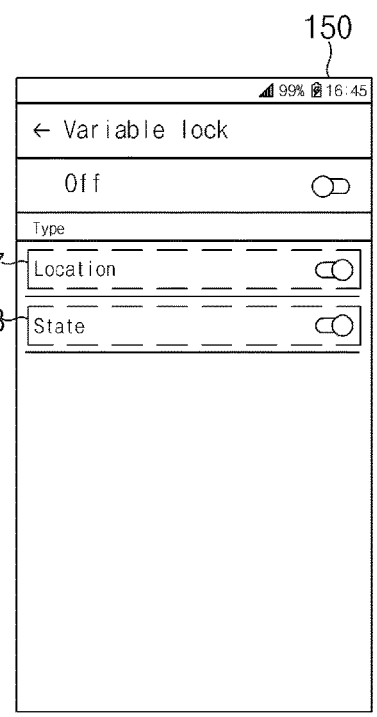

If the user selects the variable mode menu 92 on the user interface shown in FIG. 14A, the display 150 displays a user interface shown in FIG. 15F. The user interface shown in FIG. 15F includes various menus associated with the variable mode. For example, the user interface includes a menu 97 for setting a variable mode according to a position of the electronic device 100 and a menu 98 for setting a variable mode according to a state of the electronic device 100. According to an embodiment of the present disclosure, the variable mode according to the position of the electronic device 100 and the variable mode according to the state of the electronic device 100, may be simultaneously set.

Figure 16:
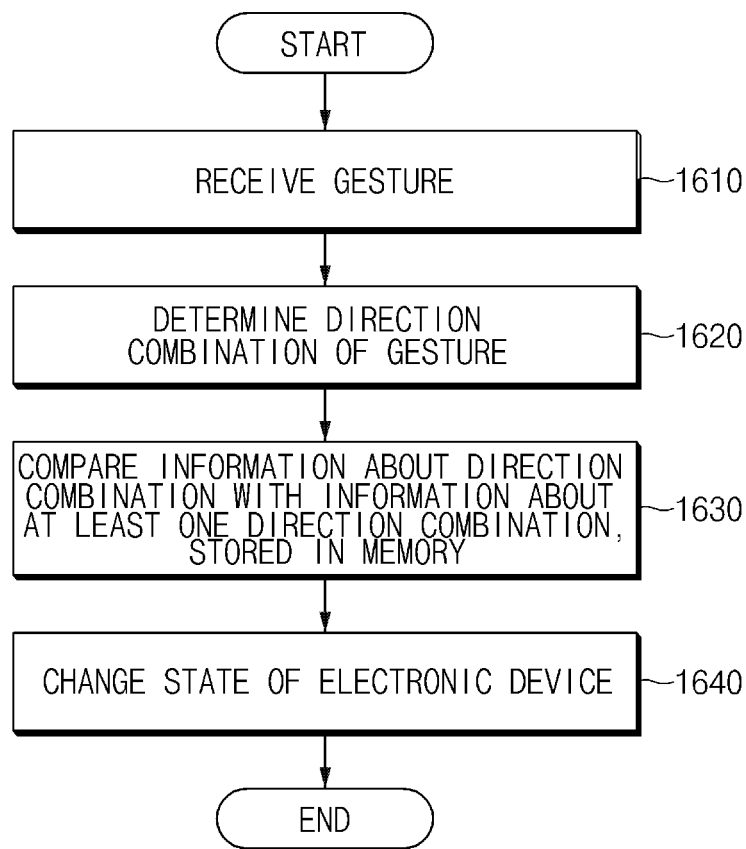
FIG. 16 is a flowchart illustrating a control method of an electronic device, according to an embodiment of the present disclosure.

FIG. 16 is a flowchart illustrating a control method of an electronic device, according to an embodiment of the present disclosure. FIG. 16 may include operations processed in the electronic device 100 shown in FIG. 1. Therefore, the components and operations of the electronic device 100, which are described with reference to FIGS. 1 to 15F, may be applied to the operations of FIG. 16.

Referring to FIG. 16, in step 1610, the electronic device 100 receives a user operation (or a gesture). According to an embodiment of the present disclosure, the electronic device 100 receives a user operation through the input module 110 of FIG. 1.

According to an embodiment of the present disclosure, if a user operation is received through the touch sensor panel 111 or the pen sensor panel 113 of FIG. 1, the electronic device 100 may classify a region where the user operation is input into a plurality of regions (e.g., two or more regions) and may detect a user operation that is input in at least some of the plurality of regions. For example, the electronic device 100 may detect a user operation that is input in one or all of the plurality of regions.

According to an embodiment of the present disclosure, the electronic device 100 may activate at least part of the touch sensor panel 111 or the pen sensor panel 113, according to information about whether the display 150 of FIG. 1 is turned on/off, the user interface displayed on the display 150, a state where a user grips the electronic device 100, or user settings.

In step 1620, the electronic device 100 determines a direction combination of a user operation. According to an embodiment of the present disclosure, the direction combination may include at least one of a direction of a user operation, an input order of the user operation, a detecting region of the user operation, or a type of a device to which the user operation is input.

According to an embodiment of the present disclosure, the electronic device 100 may analyze a user operation and may determine a direction of the user operation as one of four directions (e.g., a right direction, a left direction, an upper direction, and a lower direction). The electronic device 100 may analyze a user operation and may determine a direction of the user operation as one of eight directions (e.g., a right direction, a left direction, an upper direction, a lower direction, a right upper direction, a right lower direction, a left upper direction, and a left lower direction).

According to an embodiment of the present disclosure, the electronic device 100 may determine a direction of a user operation after a specific user operation (e.g., a double tap) is input to the input module 110 (e.g., the touch sensor panel 111) in a state where the display 150 is powered-off.

According to an embodiment of the present disclosure, the electronic device 100 may determine a direction of a user operation according to a position where the user operation moves (or positions of a start point and an end point of the user operation). The electronic device 100 may determine a direction of a user operation according to a shape of the user operation.

According to an embodiment of the present disclosure, if a user operation is detected having a specified length or more in a specific direction, the electronic device 100 may determine that the user operation is input in the specific direction. If a user operation is detected for a specified time or more in a specific direction, the electronic device 100 may determine that the user operation is input in the specific direction. After a user operation is input having a specified length or more or for a specified time or more in a first direction, if a user operation is subsequently input having the specified length or more or for a specified time or more in a second direction, the electronic device 100 may determine that a plurality of user operations are sequentially input in the first direction and the second direction.

According to an embodiment of the present disclosure, the electronic device 100 may determine a direction of a user operation relative to content displayed on the display 150. For example, the electronic device 100 may determine a direction of a user operation based on a direction of content (e.g., an image or text) displayed on the display 150.

According to an embodiment of the present disclosure, the electronic device 100 may determine a direction of a user operation relative to a direction of gravity. For example, the electronic device 100 may project a vector indicating the direction of gravity to a plane formed by the touch sensor panel 111 or the pen sensor panel 113, and may determine a direction of the projected vector as a lower direction.

According to an embodiment of the present disclosure, when determining a direction of a user operation, the electronic device 100 may correct an angle of the user operation using a tilt value of the electronic device 100. For example, if a user operation is detected in a state where the plane formed by the touch sensor panel 111 or the pen sensor panel 113 is tilted to a left side or a right side by a specific angle, the electronic device 100 may rotate the detected user operation by the tilted angle and may determine a direction of the user operation.

According to an embodiment of the present disclosure, the electronic device 100 may output a different audio signal according to a direction of a user operation. According to an embodiment of the present disclosure, the electronic device 100 may display a different object according to a direction of a user operation. According to an embodiment of the present disclosure, the electronic device 100 may generate a different vibration according to a direction of a user operation.

According to an embodiment of the present disclosure, the electronic device 100 may determine a detecting region of a user operation. For example, the input module 110 (e.g., the touch sensor panel 111) may include a plurality of regions. The electronic device 100 may determine whether a user operation is detected in any one of the plurality of regions.

According to an embodiment of the present disclosure, the electronic device 100 may determine a type of a device (or the input module 110) to which a user operation is input. For example, the electronic device 100 may determine whether a currently detected user operation is detected by the touch sensor panel 111 or the gesture sensor 115 of FIG. 1. In another example, the electronic device 100 may determine whether a currently detected user operation is detected by the input module 110 included in the electronic device 100 or the input module 210 included in the case device 200 of FIG. 11.

Referring back to FIG. 16, in step 1630, the electronic device 100 compares information about the direction combination with information about at least one direction combination, which is stored in the memory 120 of FIG. 1. According to an embodiment of the present disclosure, the electronic device 100 may map an operation (or a command), which may be performed by the electronic device 100 to each of at least one direction combination and may previously store the mapped information in the memory 120.

According to an embodiment of the present disclosure, the electronic device 100 may compare information about a direction and an input order of a user operation with information about a direction and an input order of a user operation, which is stored in the memory 120. The electronic device 100 may determine a detecting region of a user operation and may compare information about a direction, an input order, and a detecting region of the user operation with information about a direction, an input order, and a detecting region of a user operation, which is stored in the memory 120. The electronic device 100 may determine a type of a device to which a user operation is input and may compare information about a direction, an input order, and an input device of the user operation with information about a direction, an input order, and an input device of a user operation, which is stored in the memory 120.

According to an embodiment of the present disclosure, if information about a direction combination input by a user is not the same as information about a direction combination, which is stored in the memory 120, a specified number of times or more, the electronic device 100 may receive a PIN and may perform a specific operation.

In step 1640, the electronic device 100 changes its state. For example, the electronic device 100 may change its state from a lock state to an unlock state according to a direction of a user operation. In another example, the electronic device 100 may execute a specific application (e.g., a camera application or a messaging application) according to a direction of a user operation. In another example, the electronic device 100 may unlock the electronic device 100 according to a direction of a user operation. If the electronic device 100 is unlocked, it may execute a specific application.

Figure 17:
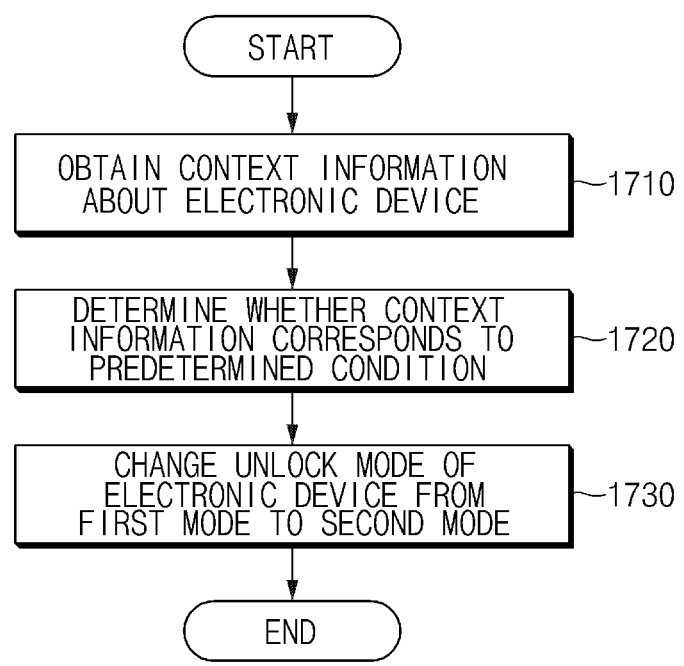
FIG. 17 is a flowchart illustrating a method for changing an unlock mode of an electronic device, according to an embodiment of the present disclosure.

FIG. 17 is a flowchart illustrating a method for changing an unlock mode of an electronic device, according to an embodiment of the present disclosure.

Referring to FIG. 17, in step 1710, the electronic device 100 of FIG. 1 obtains context information (or state information) about the electronic device 100. The context information may include, for example, at least one of a position of the electronic device 100, motion of the electronic device 100, information about whether the electronic device 100 is mounted on a vehicle, or visibility information of the display 150 included in the electronic device 100. According to an embodiment of the present disclosure, the electronic device 100 may obtain current position information using a global positioning system (GPS). The electronic device 100 may obtain serving cell identification information through a cellular network. The electronic device 100 may obtain access point (AP) identification information through a wireless-fidelity (Wi-Fi) network. The electronic device 100 may obtain its motion information using the acceleration sensor 141 or the gyro sensor 143 of FIG. 1. The electronic device 100 may communicate with a vehicle to obtain a variety of information associated with the vehicle. The electronic device 100 may obtain brightness information about the electronic device 100 using the illumination sensor 145 of FIG. 1. The electronic device 100 may obtain brightness information of the display 150. The electronic device 100 may obtain an image around the electronic device 100.

In step 1720, the electronic device 100 determines whether the context information corresponds to a specified condition. According to an embodiment of the present disclosure, the electronic device 100 may determine whether a position of the electronic device 100 corresponds to a specified position using current GPS information or serving cell identification information. The electronic device 100 may determine whether the electronic device 100 is located in a specific space (or an office or home) using AP identification information. The electronic device 100 may determine whether the electronic device 100 is in a moving state using its motion information. The electronic device 100 may determine whether the electronic device 100 is in a state where the electronic device 100 is mounted on a vehicle (or whether the user is in a driving state) using vehicle information. The electronic device 100 may determine a visibility of the display 150 using brightness information around the electronic device 100 and brightness information of the display 150. For example, if an area around the electronic device 100 is dark and if the display 150 is bright, the electronic device 100 may determine that visibility is high. In another example, if an area around the electronic device 100 is bright and if the display 150 is dark, the electronic device 100 may determine that visibility is low. The electronic device 100 may compare brightness around the electronic device 100 with brightness of the display 150 and may determine whether a difference between the brightness around the electronic device 100 and the brightness of the display 150 is greater than or equal to a specified value. The electronic device 100 may determine whether a specified person (e.g., a family member) exists around the electronic device 100 using an image around the electronic device 100.

If it is determined that context information corresponds to the specified condition, in step 1730, the electronic device 100 changes an unlock mode of the electronic device 100 from a first mode to a second mode. For example, the first mode may be an unlock mode (or a PIN mode) using a PIN or an unlock mode (or a point mode) using a specified number of points (e.g., nine points). The second mode may be an unlock mode (or a direction mode) using a direction combination. In another example, the first mode may be a lock mode using a direction combination, and the second mode may be a lock mode using a PIN.

According to various embodiments of the present disclosure, an unlock mode of the electronic device 100 may be continuously changed according to context information of the electronic device 100. If it is determined that the electronic device 100 is located in a user's home, the electronic device 100 may operate in the direction mode, which has a relatively low secure level. If it is determined that the electronic device 100 is located in a user's company, the electronic device 100 may operate in the point mode or the PIN mode, which has a relatively high secure level. If visibility of the display 150 is high, the electronic device 100 may operate in the PIN mode or the point mode, which requests input in an accurate position. If the visibility of the display 150 is low, the electronic device 100 may operate in the direction mode unnecessary for an accurate input. If the electronic device 100 is in a state where the electronic device 100 is mounted on a vehicle (or if the user is in a driving state), since the electronic device 100 does not request the user to perform an accurate input, the electronic device 100 may operate in the direction mode. If the electronic device 100 is not in the state where the electronic device 100 is mounted on the vehicle, the electronic device 100 may operate in the PIN mode or the point mode. If it is determined that a family member exists around the electronic device 100, the electronic device 100 may operate in the direction mode which has a relatively low secure level. If it is determined that a colleague or a friend exists around the electronic device 100, the electronic device 100 may operate in the PIN mode or the point mode, which has a relatively high secure level.

According to embodiments of the present disclosure, when the user inputs a direction combination into a touch screen (or a touch panel), he or she may freely input the direction combination into the touch screen (or the touch panel) without being fixed to a specific region (or a specific point) on the touch screen. If the electronic device has a wide screen, the user may input a direction combination with his or her one hand. Also, since a direction combination includes various combinations according to a direction of a user operation, an input order of the user operation, a detecting region of the user operation, and a type of a device to which the user operation is input, the electronic device may provide high security. Also, since the electronic device provides audio, visual, or vibrational feedback for a direction, the user may verify a result of inputting a direction combination.

The term "module", as used herein, may mean, for example, a unit including one of hardware, software, and firmware or two or more combinations thereof. The term "module" may be interchangeably used with, for example, the terms "unit", "logic", "logical block", "component", and "circuit". A module may be a minimum unit of an integrated component or a part thereof. A module may be a minimum unit performing one or more functions or a part thereof. A module may be mechanically or electronically implemented. For example, a module may include at least one of an application-specific integrated circuit (ASIC) chip, field-programmable gate arrays (FPGAs), or a programmable-logic device, which is well known or will be developed in the future, for performing certain operations.

According to embodiments of the present disclosure, at least part of a device (e.g., modules or the functions) or a method (e.g., operations) may be implemented with, for example, instructions stored in computer-readable storage media, which have a program module. When the instructions are executed by a processor (e.g., the control module 180 of FIG. 1), one or more processors may perform functions corresponding to the instructions. The computer-readable storage media may be, for example, the memory 120 of FIG. 1.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), a flash memory, and the like), and the like. Also, the program instructions may include, not only mechanical codes compiled by a compiler, but also high-level language codes that may be executed by a computer using an interpreter and the like. The above-described hardware device may be configured to operate as one or more software modules to perform operations according to various embodiments of the present disclosure, and vice versa.

Modules or program modules, according to embodiments of the present disclosure, may include at least one of the above-described components. Some of the above-described components may be omitted, or other additional components may be included therein. Operations executed by modules, program modules, or other elements may be executed by a successive method, a parallel method, a repeated method, or a heuristic method. Also, some of the operations may be executed in a different order or may be omitted, and other operations may be added.

According to embodiments of the present disclosure, the user of the electronic device may input patterns of various forms without refraining from an input form and an input region. Therefore, the user may unlock the electronic device with his or her one hand. Also, visually handicapped persons who do not verify a pattern input may conveniently unlock their electronic devices without information exposure.

While the present disclosure has been shown and described with reference to certain embodiments thereof, it will be understood by those skilled in the art that various changes in form and detail may be made therein without departing from the spirit and scope of the disclosure as defined by the appended claims and their equivalents.

What is claimed is:

1. An electronic device, comprising:
 a display;
 a sensor configured to detect a gesture including a first input and a second input;
 a memory configured to store information regarding at least one direction combination; and
 a processor configured to:
 activate selectively a region of the display for receiving the gesture according to left hand operation or right hand operation,
 detect the first input touched on the region of the display,
 display, upon detecting the first input, a guide comprising a plurality of direction guides, wherein a center of the guide is positioned at a same position of the first input,
 detect the second input drawing a plurality of lines originating from the first input, based on whether a user input from the first input passes on at least two direction guides of the plurality of direction guides, wherein the plurality of lines comprises at least two different directions,
 compare information regarding directions of the second input corresponding to the gesture on the display in a lock state of the electronic device with the information regarding the at least one direction combination, which is stored in the memory, and
 change a state of the electronic device from the lock state to an unlock state according to a result of comparing the information regarding the directions of the second input corresponding to the gesture with the information regarding the at least one direction combination, which is stored in the memory, wherein the result is independent of a position of the first input,
 wherein the processor is further configured to:
 control at least one of an audio module to output an audio signal having directionality according to each direction of the directions of the second input, or a motor to generate a vibration having directionality according to each direction of the directions of the second input.

2. The electronic device of claim 1, wherein a number of regions is set by a user.

3. The electronic device of claim 1, wherein the information regarding the directions of the second input corresponding to the gesture comprises at least one of an input order of the plurality of lines, the detecting region of the gesture, and a type of a device to which the gesture is input.

4. The electronic device of claim 1, wherein:
 if a second line input is detected within a specified time after a first line input drawing one of the plurality of lines is detected, the processor is further configured to include a direction corresponding to the second line input in the second input corresponding to the gesture, and
 if the second line input is detected after the specified time elapses after the first line input is detected, the processor is further configured to exclude the direction corresponding to the second line input from the second input corresponding to the gesture.

5. The electronic device of claim 1, wherein, if a first line input is detected in a first direction as a specified length or more, the processor is further configured to determine that the first line input is an input in the first direction.

6. The electronic device of claim 1, wherein, if a first line input is detected in a first direction during a specified time or more, the processor is further configured to determine that the first line input is an input in the first direction.

7. A control method of an electronic device, the method comprising:
 activating selectively a region of a display of the electronic device for receiving a gesture including a first input and a second input according to left hand operation or right hand operation of the electronic device,
 detecting the first input touched on the region of the display,
 displaying, upon detecting the first input, a guide comprising a plurality of direction guides, wherein a center of the guide is positioned at a same position of the first input,
 detecting the second input drawing a plurality of lines originating from the first input, based on whether a user input from the first input passes on at least two direction guides of the plurality of direction guides, wherein the plurality of lines comprises at least two different directions, comparing information regarding directions of the second input corresponding to the gesture on the display in a lock state of the electronic device with information regarding at least one direction combination, which is stored in a memory of the electronic device; and changing a state of the electronic device from the lock state to an unlock state, using at least one processor of the electronic device, according to a result of comparing the information regarding the directions of the second input corresponding to the gesture with the information regarding the at least one direction combination, which is stored in the memory, wherein the result is independent of a position of the first input, wherein the at least one processor is configured to control at least one of an audio module to output an audio signal having directionality according to each direction of the directions of the second input, or a motor to generate a vibration having directionality according to each direction of the directions of the second input.

8. The method of claim 7, wherein a number of regions is set by a user.

9. The method of claim 7, wherein the information regarding the directions of the second input corresponding to the plurality of gesture inputs comprises at least one of an input order of the plurality of lines, the detecting region of the gesture, and a type of a device to which the gesture is input.

10. The method of claim 7, wherein:
if a second line input is detected within a specified time after a first line input drawing one of the plurality of lines is detected, the at least one processor is further configured to include a direction corresponding to the second line input in the second input corresponding to the gesture, and if the second line input is detected after the specified time elapses after the first line input is detected, the at least one processor is further configured to exclude the direction corresponding to the second line input from the second input corresponding to the gesture.

11. The method of claim 7, wherein, if a first line input is detected in a first direction as a specified length or more, the at least one processor is further configured to determine that the first line input is an input in the first direction.

12. The method of claim 7, wherein, if a first line input is detected in a first direction during a specified time or more, the at least one processor is further configured to determine that the first line input is an input in the first direction.

* * * * *